(12) United States Patent
Koga et al.

(10) Patent No.: US 11,904,948 B2
(45) Date of Patent: Feb. 20, 2024

(54) ADHESIVELY JOINED STRUCTURE AND COMPONENT FOR VEHICLE

(71) Applicant: NIPPON STEEL CORPORATION, Tokyo (JP)

(72) Inventors: Atsuo Koga, Tokyo (JP); Masumi Koori, Tokyo (JP); Kohei Ueda, Tokyo (JP)

(73) Assignee: NIPPON STEEL CORPORATION, Tokyo (JP)

( * ) Notice: Subject to any disclaimer, the term of this patent is extended or adjusted under 35 U.S.C. 154(b) by 373 days.

(21) Appl. No.: 17/279,502

(22) PCT Filed: Sep. 27, 2019

(86) PCT No.: PCT/JP2019/038211
§ 371 (c)(1),
(2) Date: Mar. 24, 2021

(87) PCT Pub. No.: WO2020/067447
PCT Pub. Date: Apr. 2, 2020

(65) Prior Publication Data
US 2021/0387679 A1  Dec. 16, 2021

(30) Foreign Application Priority Data

Sep. 28, 2018  (JP) .................................. 2018-185609
Sep. 28, 2018  (JP) .................................. 2018-185610

(51) Int. Cl.
*B62D 29/00*    (2006.01)
*B32B 7/12*     (2006.01)
(Continued)

(52) U.S. Cl.
CPC ............. *B62D 29/007* (2013.01); *B32B 7/12* (2013.01); *B32B 15/08* (2013.01); *B32B 15/18* (2013.01);
(Continued)

(58) Field of Classification Search
CPC .............. Y10T 428/19; Y10T 428/192; Y10T 428/24355; Y10T 428/24372;
(Continued)

(56) References Cited

U.S. PATENT DOCUMENTS 4,978,582 A * 12/1990 Stamm .................... B32B 27/18
                                                         428/614
5,356,715 A * 10/1994 Levine .................... B32B 15/08
                                                         428/458

(Continued)

FOREIGN PATENT DOCUMENTS

JP      2004-83977 A    3/2004
JP      2006-167797 A   6/2006
(Continued)

OTHER PUBLICATIONS

Machine translation (Espacenet) of JP 2017-121778 A. Translated May 20, 2023. (Year: 2023).*

(Continued)

*Primary Examiner* — Maria V Ewald
*Assistant Examiner* — Ethan A. Utt
(74) *Attorney, Agent, or Firm* — Birch, Stewart, Kolasch & Birch, LLP

(57) ABSTRACT

This bonded structure includes a first member having a metal portion and a film portion disposed on at least a part of a surface of the metal portion; a second member; an adhesive layer for joining the first member and the second member to each other via the film portion. The film portion contains a resin and inorganic particles. The inorganic particles are formed of ferrosilicon or non-oxide ceramics containing V. Some of the inorganic particles protrude toward the adhesive layer. The particle size of at least some of the inorganic particles protruding toward the adhesive layer is less than the film thickness of the film portion.

17 Claims, 4 Drawing Sheets

(51) Int. Cl.
   *B32B 15/08* (2006.01)
   *B32B 15/18* (2006.01)
   *B62D 27/02* (2006.01)
(52) U.S. Cl.
   CPC ......... *B62D 27/026* (2013.01); *B62D 29/005* (2013.01); *B32B 2307/202* (2013.01); *B32B 2307/54* (2013.01); *B32B 2307/732* (2013.01)
(58) Field of Classification Search
   CPC ..... Y10T 428/24413; Y10T 428/24421; Y10T 428/25; Y10T 428/252; Y10T 428/256; Y10T 428/259; Y10T 428/31511; Y10T 428/31515; Y10T 428/31522; Y10T 428/31529; Y10T 428/31551; Y10T 428/31605; Y10T 428/31609; Y10T 428/31678; Y10T 428/31681; Y10T 428/31688; Y10T 428/31692; Y10T 428/31699; Y10T 428/28; Y10T 428/2804; Y10T 428/2809; Y10T 428/2852; Y10T 428/287; Y10T 428/2878; Y10T 428/2891; Y10T 428/2896; B32B 5/00; B32B 5/16; B32B 5/22; B32B 5/30; B32B 7/00; B32B 7/04; B32B 7/05; B32B 7/12; B32B 15/00; B32B 15/04; B32B 15/043; B32B 15/08; B32B 15/082; B32B 15/09; B32B 15/092; B32B 15/095; B32B 15/098; B32B 15/16; B32B 15/18; B32B 27/00; B32B 27/04; B32B 27/18; B32B 27/20; B32B 27/30; B32B 27/308; B32B 27/38; B32B 27/40; B32B 27/42; B32B 2264/00; B32B 2264/10; B32B 2264/105; B32B 2264/107; B32B 2264/12; B32B 2264/20; B32B 2264/202; B32B 2264/30; B32B 2264/303; B32B 2264/50; B32B 2264/503; B32B 2605/00; B32B 2605/08
   USPC ... 428/57, 58, 141, 143, 148, 323, 325, 328, 428/331, 357, 402, 413, 414, 416, 418, 428/423.1, 425.8, 425.9, 457, 458, 460, 428/461, 463, 343, 344, 345, 354, 355 R, 428/355 EP, 355 EN, 355 AC, 355 N
   See application file for complete search history.

(56)        References Cited

U.S. PATENT DOCUMENTS

| 2015/0044450 | A1 | 2/2015 | Yuasa et al. | |
| 2018/0037964 | A1* | 2/2018 | Murata | C22C 38/06 |
| 2018/0112084 | A1* | 4/2018 | Kawamura | C25D 13/22 |

FOREIGN PATENT DOCUMENTS

| JP | 2016194138 A | * | 11/2016 | ............ C21D 6/005 |
| JP | 2017121778 A | * | 7/2017 | |
| WO | WO-2016159138 A1 | * | 10/2016 | ............... B05D 7/14 |

OTHER PUBLICATIONS

"Aluminium and aluminium alloy sheets, strips and plates", JIS H 4000: 2006 (Revised on 2017), total of 46 pages.
"Ferrosilicon", JIS G 2302: 1998, total of 10 pages.
"Metallic materials—Tensile testing—Method of test at room temperature", JIS Z 2241: 2011, total of 23 pages.
"Test methods for pigments—Part 13: Oil absorption—Section 2: Boiled linseed oil method", JIS K 5101-13-2: 2004, total of 7 pages.

* cited by examiner

ADHESIVELY JOINED STRUCTURE AND COMPONENT FOR VEHICLE

TECHNICAL FIELD OF THE INVENTION

The present invention relates to an adhesively joined structure and a component for a vehicle. Priority is claimed on Japanese Patent Application No. 2018-185609, filed in Japan on Sep. 28, 2018 and Japanese Patent Application No. 2018-185610, filed in Japan on Sep. 28, 2018, the contents of which are incorporated herein by reference.

RELATED ART

In the industrial field of transportation equipment such as vehicles, the application of an adhesive in joining between members is increasing for the purpose of improving vehicle body stiffness, assisting in welded part fracture, joining dissimilar materials, and the like. Since a significant improvement in performance can be expected by joining the members to each other using the adhesive, this is important as a method for reducing the weight of vehicle bodies. For this reason, in developing adhesively joined structures using an adhesive between metal members or between a metal member and another material as vehicle body components, various studies have been performed for the purpose of improving the joining strength between the members.

In the joining between the members, it is important to sufficiently impart an adhesive to a joining part of each member. In Patent Document 1, it is proposed to perform a surface treatment to increase wettability to an adhesive in a curved portion where the adhesive does not adhere easily in a metal sheet. Additionally, Patent Document 1 discloses that metal sheets are joined to each other by using bonding with an adhesive and welding in combination.

Patent Document 2 discloses a metal material in which a chemical treatment film layer containing a main agent component or a crosslinking agent component of a wood-based adhesive is precipitated and locked on the surface of the metal material to improve adhesiveness to wood.

PRIOR ART DOCUMENT

Patent Document

[Patent Document 1] Japanese Unexamined Patent Application, First Publication No. 2006-167797
[Patent Document 2] Japanese Unexamined Patent Application, First Publication No. 2004-83977

DISCLOSURE OF THE INVENTION

Problems to be Solved by the Invention

Meanwhile, in a case where an adhesive is applied to join steel sheets, the performance of components may deteriorate due to deterioration of the adhesive (decrease in adhesion) depending on use environments. For that reason, when an adhesive is used for joining, there are some parts where long-term guarantee is difficult, and the application of the adhesive is limited in such parts. Additionally, there is a case where the design is made in anticipation of the deterioration of the adhesive. Currently, higher bonding durability is required than any of the techniques disclosed in Patent Documents 1 and 2.

Thus, the present invention has been made in view of the above problems, and an object of the present invention is to provide an adhesively joined structure manufactured by joining a metal member and another member with an adhesive and having excellent bonding durability, and a component for a vehicle including the adhesively joined structure.

Means for Solving the Problem

The present inventors have studied the cause of the decrease in the adhesion between the metal member and the adhesive layer and have found that the causes are entering of water into an interface between the metal member and the adhesive layer and corrosion of the surface of the metal member, and excessive elution of components from a surface-treated film present on the surface of the metal member. Particularly, the entering of water into the interface between the metal member and the adhesive layer induces the corrosion of the metal member and the elution of components from the surface-treated film.

From this, a relationship between the configuration of a film portion formed on the metal member and the water entering the bonding interface was investigated in order to suppress the entering of water into the interface between the metal member and the adhesive layer. As a result, the present inventors have found that the bonding durability is improved by making inorganic particles formed of ferrosilicon or non-oxide ceramics containing V contained in the film portion in contact with the adhesive layer and making some of the inorganic particles protrude toward the adhesive layer side, and have conceived the present invention.

A summary of the present invention completed on the basis of the above findings is as follows.

(1) An adhesively joined structure including a first member having a metal portion and a film portion disposed on at least a part of a surface of the metal portion; a second member; an adhesive layer for joining the first member and the second member to each other via the film portion, the film portion containing a resin and inorganic particles, the inorganic particles being formed of ferrosilicon or non-oxide ceramics containing V, some of the inorganic particles protruding toward the adhesive layer, and the particle size of at least some of the inorganic particles protruding toward the adhesive layer being less than the film thickness of the film portion.

(2) The adhesively joined structure described (1) in which, in a cross section taken in a thickness direction of the film portion, an average presence number of the protruding inorganic particles of which the particle size is less than the film thickness of the film portion is 0.5 pieces to 20.0 pieces per length 500 µm in a surface direction of a surface of the film portion on the adhesive layer side.

(3) The described adhesively joined structure described in (1) or (2) in which, in a cross section taken in a thickness direction of the film portion, the percentage of a protruding width of the inorganic particles to an average particle size of the inorganic particles is 10% to 95% on average, and in the cross section, an average presence number of the protruding inorganic particles per length 500 µm in a surface direction of a surface of the film portion on the adhesive layer side is 1.0 piece to 20.0 pieces.

(4) The adhesively joined structure described in any one of (1) to (3) in which an average particle size of the inorganic particles is 2.0 µm to 15.0 µm, and the average thickness of the film portion is 1.0 μm to 20.0 μm.
(5) The adhesively joined structure described in any one of (1) to (4) in which the film portion further contains conductive particles.
(6) The adhesively joined structure described in (5) in which the conductive particles include doped zinc oxide particles.
(7) The adhesively joined structure described in (6) in which the film portion further contains an antirust pigment containing Mg.
(8) The adhesively joined structure described in any one of (1) to (7) in which the film portion further contains a vanadium-based antirust pigment.
(9) The adhesively joined structure described in any one of (1) to (8) in which the film portion further contains a silica-based antirust pigment.
(10) The adhesively joined structure described in any one of (1) to (9) in which a resin of an adhesive constituting the adhesive layer has a common chemical structure with the resin in the film portion.
(11) The adhesively joined structure described in any one of (1) to (10) in which the adhesive layer contains an epoxy resin-based adhesive or an urethane resin-based adhesive.
(12) The adhesively joined structure described in any one of (1) to (11) in which the adhesive layer contains the inorganic particles.
(13) The adhesively joined structure described in any one of (1) to (12) in which the metal portion is a steel.
(14) The adhesively joined structure described in any one of (1) to (13) in which the metal portion is a zinc-plated steel sheet.
(15) The adhesively joined structure described in any one of (1) to (14) in which the metal portion is a galvannealed steel sheet having a tensile strength of 980 MPa or more.
(16) A component for a vehicle including the adhesively joined structure described in any one of (1) to (15).

Effects of the Invention

As described above, according to the present invention, it is possible to provide the adhesively joined structure manufactured by joining a metal member and another member with an adhesive and having excellent bonding durability, and the component for a vehicle including the adhesively joined structure.

EMBODIMENTS OF THE INVENTION

Figure 1:
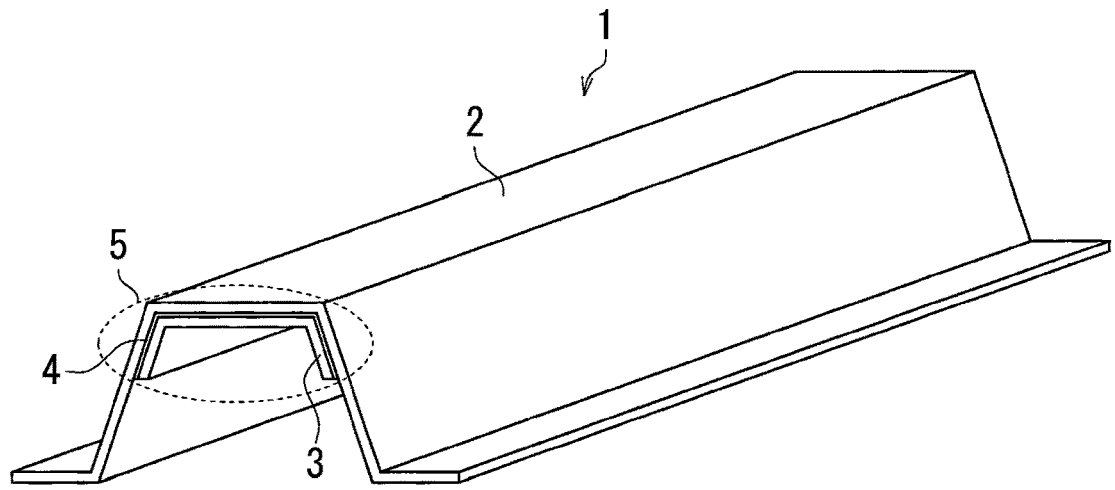
FIG. 1 is a schematic perspective view of an adhesively joined structure according to an embodiment of the present invention.

Preferred embodiments of the present invention will be described in detail below with reference to the accompanying drawings. In addition, in the present specification and drawings, components having substantially the same functional configuration are designated by the same reference numerals to omit duplicate description.

1. Configuration of Adhesively Joined Structure

Figure 2:
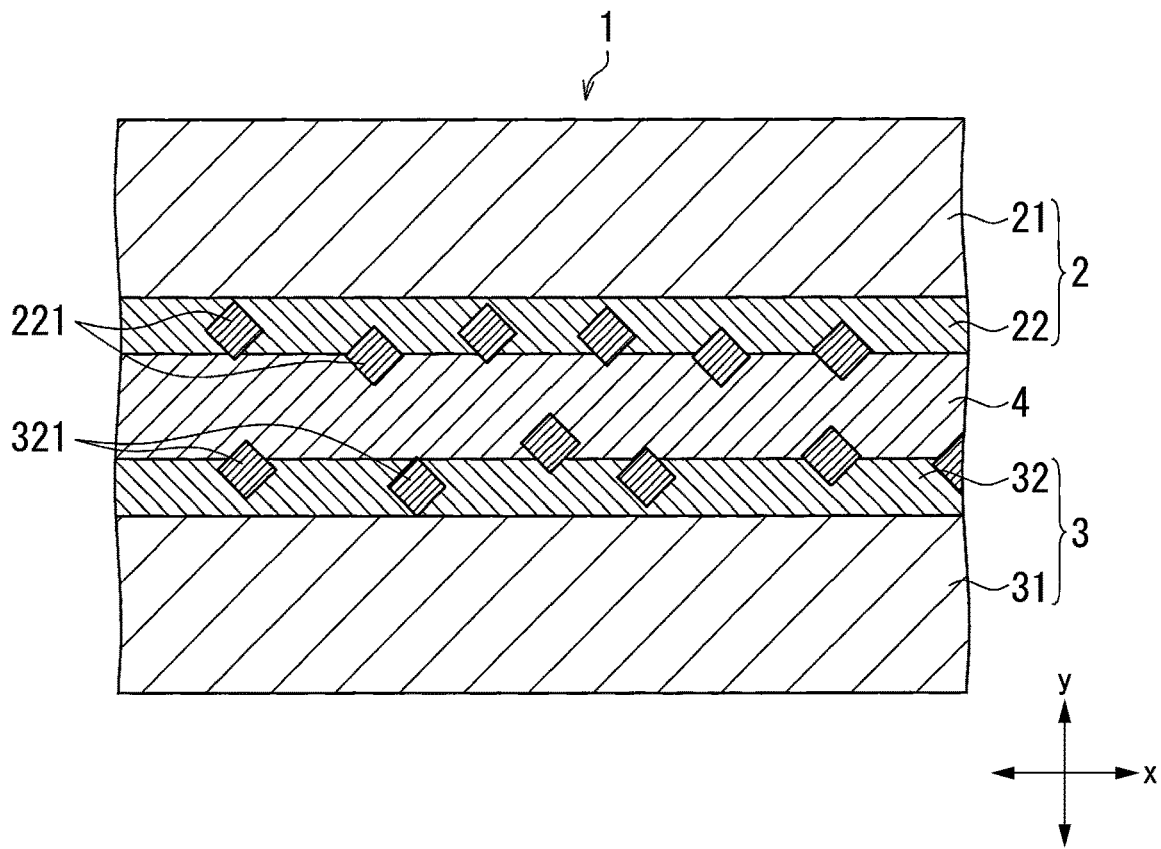
FIG. 2 is a partially enlarged cross sectional view of a joining region of the adhesively joined structure illustrated in FIG. 1.
Figure 3:
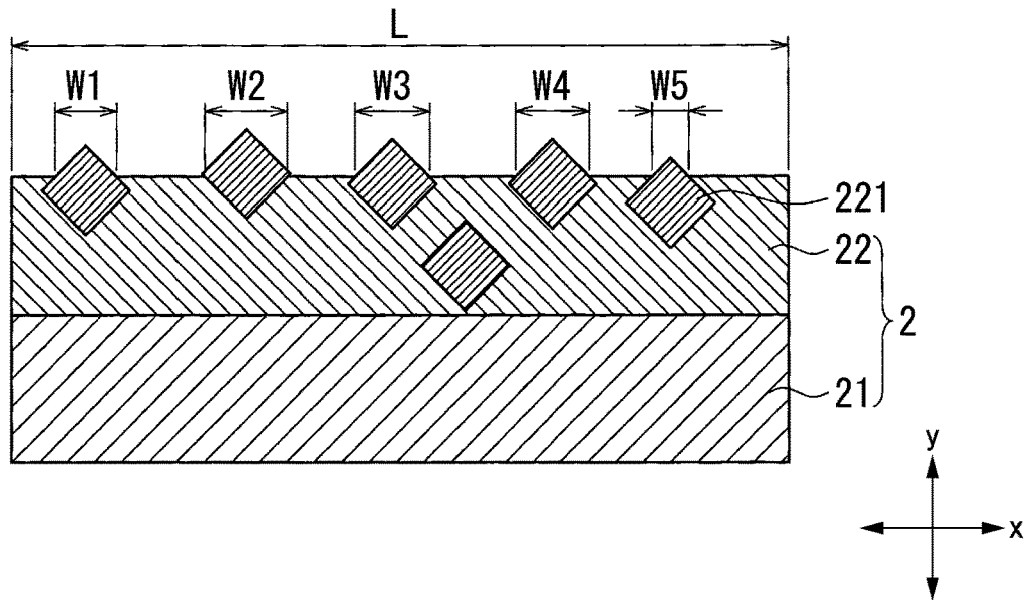
FIG. 3 is a schematic cross sectional view showing a method of calculating the percentage of the protruding width of inorganic particles in a film portion included in the adhesively joined structure illustrated in FIG. 1.

FIG. 1 is a schematic perspective view of an adhesively joined structure according to the present embodiment, FIG. 2 is a partially enlarged cross sectional view of a joining region of the adhesively joined structure illustrated in FIG. 1, and FIG. 3 is a schematic cross sectional view showing a method of calculating the percentage of the protruding width of inorganic particles in a film portion included in the adhesively joined structure illustrated in FIG. 1.

The adhesively joined structure 1 illustrated in FIG. 1 has a first member 2 and a second member 3. The first member 2 is a so-called hat-type metal member. That is, the first member 2 includes a web portion, a pair of standing wall portions connected to both side edges of the web portion in a width direction, and a pair of flange portions connected to the standing wall portions and is a metal member of which the cross-cross sectional shape perpendicular to a longitudinal direction is hat-type. The web portion has a rectangular shape that is long in one direction. Also, the second member 3 has a shape along the inside of the web portion of the first member 2 and is joined to the first member 2 via an adhesive layer 4 in a joining region 5 inside the web portion. Here, the inside of the web portion means a region surrounded by the web portion and the standing wall portions.

In addition, in order to facilitate the description of the configuration of the joined structure of the present embodiment, the description will be made on the premise that the first member 2 has a hat type in FIG. 1. However, as will be described below, of course, the respective members constituting a bonded structure in the embodiment are not limited to the shapes of the illustrated aspect. Additionally, in the present embodiment, at least the first member 2 may be a metal member. However, in the following description, a case where both the first member 2 and the second member 3 are metal members will be described as an example. Hereinafter, the configuration in the joining region 5 will be described with reference to FIG. 2.

[1.1. First Member 2]

The first member 2 is a metal member as described above and has a metal portion 21 and a film portion 22 formed on at least a part of the surface of the metal portion 21.

[Metal Portion 21]

Examples of the material of the metal portion 21 include iron, titanium, aluminum, magnesium, and alloys thereof. Here, examples of the alloys include iron-based alloys (including stainless steel), Ti-based alloys, Al-based alloys, Mg alloys, and the like. The material of the metal portion 21 is preferably an steel material (steel), an iron-based alloy, titanium, and aluminum, and more preferably an steel material having a higher tensile strength than other metal species. Examples of such steel material include steel materials standardized in the Japanese Industrial Standards (JIS) and the like and may include carbon steel, alloy steel, and high tensile strength steel used for general structures and mechanical structures. Specific examples of such steel materials include cold-rolled steels, hot-rolled steels, hot-rolled steel sheet materials for vehicle structures, hot-rolled high tensile strength steel sheet materials for vehicle processing, cold-rolled steel sheet materials for vehicle structures, cold-rolled high tensile strength steel sheet materials for vehicle structures, high tensile strength steels that are generally referred to as hot stamp materials subjected to quenching during hot working, and the like. The components of such steel materials are not particularly limited, and may contain one or two or more of Si, Mn, S, P, Al, N, Cr, Mo, Ni, Cu, Ca, Mg, Ce, Hf, La, Zr, and Sb in addition to Fe and C. One or two or more of these elements can be appropriately selected in order to obtain the required material strength and formability, and the amounts thereof can also be appropriately adjusted.

Additionally, when the material of the metal portion 21 is an aluminum alloy, the weight of the first member 2 can be reduced, which is suitable. Examples of the aluminum alloy include aluminum alloys containing one or two or more of Si, Fe, Cu, Mn, Mg, Cr, Zn, Ti, V, Zr, Pb, and Bi, and for example, generally known aluminum alloys such as 1000 series, 2000 series, 3000 series, 4000 series, 5000 series, 6000 series, and 7000 series described in the above JIS H4000: 2006 are mentioned as the material of the metal portion 21. The 5000 series and 6000 series, which have strength and formability, are suitable as the metal portion 21 of the first member 2. As the magnesium alloy, magnesium alloys containing one or two or more of Al, Zn, Mn, Fe, Si, Cu, Ni, Ca, Zr, Li, Pb, Ag, Cr, Sn, Y, Sb, and other rare earth elements are mentioned as the material of the metal portion 21, and generally known magnesium alloys such as an AM series containing Al, which are described in the ASTM standard, an AZ series containing Al and Zn, and a ZK series containing Zn are mentioned as the material of the metal portion 21. In addition, in a case where the metal portion 21 has a plate shape, the metal portion 21 may be formed.

In a case where the material of the metal portion 21 is an steel material, the steel material may be subjected to any surface treatment. Here, the surface treatment includes, for example, various kinds of plating treatment such as zinc plating, aluminum plating, and tin plating, chemical treatment such as zinc phosphate treatment, chromate treatment, and chromate-free treatment, physical surface roughening treatment such as sandblasting, and chemical surface roughening treatment such as chemical etching but is not limited to these. Additionally, a plurality of kinds of surface treatment may be applied. As the surface treatment, it is preferable that at least a treatment for the purpose of imparting antirust properties is performed.

Particularly, plating steels subjected to plating treatment among the steel materials are preferable as the metal portion 21 due to excellent corrosion resistance. Examples of the plating steels, which are particularly preferable as the metal portion 21, include zinc-plated steel sheets, Ni-plated steel sheets, alloyed Ni-plated steel sheets, which are alloyed by heat-treating the Ni-plated steel sheets and diffusing Fe in Ni plating, Al-plated steel sheets, tin-plated steel sheets, chrome-plated steel sheets, and the like. Since the zinc-plated steel sheets have excellent corrosion resistance, the zinc-plated steel sheets are suitable as the metal portion 21. Examples of the zinc-plated steel sheets include molten zinc-plated steel sheets, zinc alloy-plated steel sheets, galvannealed steel sheets, which are alloyed by heat-treating the zinc alloy-plated steel sheets and diffusing Fe in the zinc plating, electrolytic zinc-plated steel sheets, electrolytic Zn—Ni-plated steel sheets, molten Zn—Al alloy-plated steel sheets represented by molten Zn-5% Al alloy-plated steel sheets and molten 55% Al—Zn alloy-plated steel sheets, molten Zn—Al—Mg alloy-plated steel sheets represented by molten Zn-1 to 12% Al-1 to 4% Mg alloy-plated steel sheets and molten 55% Al—Zn-0.1 to 3% Mg alloy-plated steel sheet, and the like. Among these, the Zn—Al—Mg alloy-plated steel sheets are more suitable as the metal portion 21 because Zn—Al—Mg alloy-plated steel sheets have more excellent corrosion resistance.

Meanwhile, in the galvannealed steel sheets, in a case where an adhesive (for example, a structural adhesive) having high bonding strength is used, there is a concern that the galvannealed steel sheets are distorted and alloy layers thereof are fractured, so that the original bonding strength is not exhibited. However, the present inventors have found that, when a high-strength galvannealed steel sheet is used as the metal portion 21, it is possible to suppress the fracture of a plated alloy layer and increase the bonding strength between the first member 2 and the second member 3.

It is considered that this is because the high strength steel sheet is less likely to be distorted in a case where stress is loaded to the adhesively joined structure 1. That is, generally, in a case where low-strength steel sheets are bonded to each other, the steel sheets are also distorted in addition to the adhesive when stress such as tensile stress or shear stress is generated in the steel sheets. The distortion is concentrated particularly at an end portion of a joining part. As a result, a plated alloy layer of a distortion concentration portion is fractured, and exfoliation occurs at an early stage. In contrast, in a case where a high strength steel sheet is used, the distortion due to loaded stress is small. Therefore, the distortion concentration at the end portion of the joining part is prevented. As a result, it is possible to suppress the fracture of the plated alloy layer at the joining part and receive the stress in the entire adhesive layer. Particularly, in a galvannealed steel sheet having a tensile strength of 980 MPa or more, the bonding strength between the first member 2 and the second member 3 can be further increased.

Therefore, the high-strength galvannealed steel sheet, for example, a galvannealed steel sheet having a tensile strength of 980 MPa or more is preferably used as the metal portion 21. Accordingly, the bonding strength between the first member 2 and the second member 3 can be much further increased. In this case, when the adhesively joined structure 1 is stressed, it is possible to receive the stress in the entire adhesive layer 4. Therefore, the effect of bonding durability in the present invention described below can be much further obtained. In addition, the tensile strength of the steel sheets can be measured according to JIS Z2241: 2011.

[Film Portion 22]

As described above, the adhesively joined structure 1 has the film portion 22 on at least a part of the surface of the first member 2. That is, the film portion 22 is formed on at least a part of the surface of the metal portion 21. At least a part of the film portion 22 is in contact with the adhesive layer 4, and as a result, the first member 2 is bonded to the second member 3 by the adhesive layer 4 via the film portion 22. Additionally, the film portion 22 contains at least inorganic particles 221 and a resin. Hereinafter, the configuration of the film portion 22 will be described in detail.

[Inorganic Particles 221]

The inorganic particles 221 contained in the film portion 22 are constituted of ferrosilicon or non-oxide ceramics containing V. Also, some of the inorganic particles 221 protrude toward the adhesive layer 4. Accordingly, water entering a bonding interface between the adhesive layer 4 and the first member 2 is prevented, and the bonding durability of the adhesively joined structure 1 is improved.

The surface of the inorganic particles 221 protruding toward the adhesive layer 4 may be covered with other components of the film portion 22 such as resin. Even in such a case, as long as the inorganic particles 221 protrude toward the adhesive layer 4, the above effect is sufficiently exhibited.

Generally, vehicle components are manufactured by press forming using a die and punch or the like. When such press forming is performed, pressure is applied to the film surface. Additionally, the surface of the film portion 22 is slid during working such as drawing in which a material flows into the die and punch. In this case, the inorganic particles 221 protruding from the surface of the film portion 22 are pushed into the film portion 22.

The particle size of at least some of the inorganic particles 221 among the inorganic particles 221 protruding toward the adhesive layer 4 is smaller than the film thickness of the film portion 22 (less than the film thickness). In this case, even if the inorganic particles 221 are pushed into the film portion 22 during the press working, the inorganic particles 221 protrude again from the surface due to the elastic recovery of the resin after the press working. Additionally, in a case where the particle size of at least some of the inorganic particles 221 is smaller than the film thickness of the film portion 22, the falling-off of particles larger than the film thickness of the film portion 22 is suppressed. As a result, the structure in which the inorganic particles 221 protrude can be maintained even after the press working.

On the other hand, in a case where the particle size of all the protruding inorganic particles 221 is larger than the film thickness of the film portion 22, the particles are likely to be missing or fall off from the film due to the contact pressure and sliding during the press working. As a result, there is a case where the structure in which the inorganic particles 221 protrude onto the surface of the film portion 22 cannot be maintained even after the press working. Additionally, in a case where the particle size of all the protruding inorganic particles 221 is larger than the film thickness of the film portion 22, there is a case where the bonding durability decreases. From the above, it is important that the particle size of at least some of the inorganic particles 221 among the protruding inorganic particles 221 is smaller than the film thickness of the film portion 22.

The degree of protrusion of the inorganic particles 221 to the adhesive layer 4 can be observed and calculated as follows, for example. Hereinafter, a description will be made with reference to FIG. 3. First, by cutting the part of the adhesively joined structure 1 on which the film portion 22 is disposed, the cross section of the portion is exposed, the cross section of the portion is further polished, and a cross sectional sample in the thickness direction of the first member 2 of the film portion 22 is obtained. Next, the portion of the film portion 22 of the cross sectional sample is observed with a scanning electron microscope to obtain an observation image of the cross section of the film portion 22. Protruding widths W1 to W5 on the surface of the film portion 22 are measured for top five protruding widths protruding toward the adhesive layer 4 side among the inorganic particles 221 present in the visual field of the observation image, and an average value Wave of the protruding widths is obtained.

If at least some of the inorganic particles 221 are present on the adhesive layer 4 side from the surface position of the film portion 22, it is determined that the inorganic particles 221 protrude.

Here, when the width direction of the observation image is an X direction and the thickness direction is a Y direction, the surface position of the film portion 22 means the average of the surface positions (Y coordinates) of the film portion 22 measured at five points obtained by dividing the observation image into five equal parts in the X direction. In a case where the shape of the film portion 22 at a measurement point is not flat and the shape of the inorganic particles 221 and the shape of the film portion 22 directly above the inorganic particles 221 are similar to each other, the measurement point is regarded as a point where the inorganic particles 221 protrude, and the surface position of the film portion 22 is measured at a point closest to an initial measurement point where these conditions are not satisfied.

The protruding width is the length of the inorganic particles 221 that is maximum in the X direction in some of the inorganic particles 221 on the adhesive layer 4 side from the surface position of the film portion 22. The degree of protrusion of the inorganic particles 221 is determined from the protruding width and the average particle size.

Here, the "average particle size" of the inorganic particles 221 means an average primary particle size in a case where the inorganic particles 221 present in the film portion 22 are present alone and means an average secondary particle size representing the particle size of the inorganic particles 221 at the time of cohesion in a case where the inorganic particles 221 cohere and are present. The average particle size of the inorganic particles 221 is preferably determined by the following measurement method.

The average particle size of the inorganic particles 221 can be obtained by selecting top five lengths of major axis diameters from the inorganic particles 221 present in the visual field of the observation image and measuring the major axis diameter of each inorganic particle 221. An average value of the major axis diameters of these particles was calculated and used as the average particle size.

The degree of protrusion of the inorganic particles 221 is evaluated by calculating the ratio of an average protruding width Wave (μm) of the inorganic particles 221 to the average particle size (μm) of the inorganic particles 221 of the film portion 22 by the following Formula (1). Specifically, the percentages (%) of the protruding widths are calculated at the five observation points obtained by dividing the film portion 22 into the five equal parts in the width direction, and the percentages (%) of the protruding widths are averaged to obtain the final percentages (protrusion rates) (%) of the protruding widths of the inorganic particles 221 in the film portion 22.

Protrusion rate (%)=(Average protruding width Wave of inorganic particles 221)/(Average particle size of inorganic particles 221)×100 (1)

In the present embodiment, the protrusion rates (%) of the inorganic particles 221 calculated by the above Formula (1) are preferably 10% to 95% and more preferably 50% to 95%. In this way, as each inorganic particle 221 near the surface of the film portion 22 sufficiently protrudes from the film portion 22, the inorganic particles 221 formed of the ferrosilicon or the non-oxide ceramics containing V are more likely to be eluted with water, and the above-described effects can be sufficiently obtained.

Additionally, an average presence number N of protruding inorganic particles 221 (protruding particles) per length 500 µm in the surface direction of the surface of the film portion 22 on the adhesive layer 4 side is obtained by the following Formula (2).

Average presence number N=(Average value M of number of inorganic particles 221 protruding from film portion 22 present in observed cross section)/(Width of observed cross section L (µm))×500       (2)

In addition, the average value M is an average value of the numbers of inorganic particles 221 protruding from the film portion 22 at the five observation points obtained by dividing the film portion 22 into the five equal parts in the width direction.

The average presence number N is preferably 1.0 pieces to 20.0 pieces and more preferably 1.5 pieces to 10.0 pieces. Accordingly, it is possible to achieve both the bonding strength and the bonding durability between the first member 2 and the adhesive layer 4 at a higher level. That is, as the inorganic particles 221 appropriately protrude from the film portion 22, the above-described effects of the inorganic particles 221 are sufficiently exhibited, and a resin portion of the film portion 22 sufficiently comes in contact with the adhesive layer 4 to improve the bonding strength.

The average presence number of protruding particles having a particle size equal to or less than the film thickness of the film portion 22 per 500 µm is preferably 0.5 pieces to 20 pieces and more preferably 3 pieces to 15 pieces. Accordingly, for example, even if the inorganic particles 221 protruding from the surface of the film portion 22 are pushed into the resin constituting the film portion 22 by the press working, the inorganic particles 221 protrude again from the surface due to the elastic recovery of the resin after the working. Therefore, the bonding durability can be maintained.

The average particle size of the inorganic particles 221 is not particularly limited but is preferably 0.5 to 15.0 µm. In a case where the average particle size of the inorganic particles 221 is less than 0.5 µm, the inorganic particles 221 are difficult to obtain and are disadvantageous in terms of cost, and there is a case where the inorganic particles 221 are less likely to protrude from the surface of the film portion 22 depending on the adhesion amount, the film thickness, other configurations, and the like of the film portion 22. On the other hand, in a case where the average particle size of the inorganic particles 221 exceeds 15.0 µm, the presence ratio of the inorganic particles 221 in the film portion 22 decreases. Therefore, there is a case where the effect of preventing the entering of water due to the elution of the inorganic particles 221 is less likely to be obtained depending on the adhesion amount, the film thickness, other configurations, and the like of the film portion 22.

The average particle size of the inorganic particles 221 is more preferably 1.0 or more and more preferably 5 µm or less in order to simultaneously and effectively obtain the protrusion percentage from the film portion 22 and the effect of preventing the entering of water.

Additionally, as will be described below, from the viewpoint that the inorganic particles 221 are more likely to protrude from the film portion 22, the average particle size of the inorganic particles 221 is preferably relatively large with respect to the average thickness of the film portion 22. Specifically, the ratio of the average particle size of the inorganic particles 221 to the average thickness of the film portion 22 is preferably 0.5 times or more and more preferably 1.0 time or more.

The particle shape of the inorganic particles 221 is not particularly limited, and may be, for example, a sphere-like shape such as a spherical shape, a pseudo-spherical shape (for example, an elliptical spherical shape, a chicken egg shape, a rugby ball shape, or the like), a polyhedral shape (for example, a soccer ball shape, a dice shape, brilliant-cut shapes of various jewels), an elongated shape (for example, a rod shape, a needle shape, a fibrous shape, or the like), or a planar shape (for example, a flake shape, a flat plate shape, a sheet shape, or the like). Among the above-described ones, the shape of the inorganic particles 221 is preferably a spherical shape because the inorganic particles easily protrude when the shape is close to a sphere-like shape.

In addition, in the film portion 22, other particles may be present together with the inorganic particles 221. In this case, for example, the inorganic particles 221 can be specified by specifying atoms constituting the inorganic particles 221 by energy dispersive X-ray analysis with respect to the above cross section, for example, V.

(Non-Oxide Ceramics Containing V)

Next, the non-oxide ceramics containing V constituting the inorganic particles 221 will be described. The non-oxide ceramics containing V can be eluted in water, and the water, which has entered an interface between the film portion 22 and the adhesive layer 4, reacts with the non-oxide ceramics containing V and is consumed. Then, the non-oxide ceramics containing V precipitates and deposits on the interface between the film portion 22 and the adhesive layer 4 as a vanadium compound after the reaction and the precipitates and deposits play a barrier function against the entering of water. The water consumption action and the barrier function of such non-oxide ceramics containing V prevent water from entering the bonding interface between the adhesive layer 4 and the first member 2.

Also, by preventing water from entering the bonding interface between the adhesive layer 4 and the first member 2, corrosion of the metal portion 21 is prevented, and unintentional outflow of components from the film portion 22 is also suppressed. Moreover, the water resistance against the adhesive layer 4 is improved by the non-oxide ceramics containing V, and the deterioration of the adhesive layer 4 mediated by water is also suppressed. As the above acts in combination, the bonding durability of the adhesively joined structure 1 is improved.

Here, the non-oxide ceramics are ceramics formed of elements or compounds containing no oxygen. Examples of the non-oxide ceramics containing V include boride ceramics, nitride ceramics, silicide ceramics, and carbide ceramics, which contain V. These are non-oxide ceramics containing V, which has boron B, nitrogen N, silicon Si, and carbon C as principal non-metal constituent elements, respectively.

More specifically, examples of the non-oxide ceramics containing V include vanadium monoborides (VB, electric resistivity $35\times10^{-6}$ Ωcm), vanadium diborides (VB$_2$, electric resistivity $150\times10^{-6}$ Ωcm), vanadium nitrides (VN, electric resistivity $150\times10^{-6}$ Ωcm), vanadium silicides such as V$_5$Si$_3$ (electric resistivity $115\times10^{-6}$ Ωcm) and VSi$_2$ (electric resistivity $9.5\times10^{-6}$ Ωcm), vanadium carbides such as vanadium monocarbides (VC) and vanadium dicarbides (VC$_2$), and the like.

The above-described non-oxide ceramics containing V are dissolved in water to exhibit in the above-described effects and also have an antirust effect. Moreover, since the boride ceramics, the nitride ceramics and the suicide ceramics have low electric resistivity and have conductivity, these ceramics also function as conductive particles and contribute to the improvement of weldability and electrodeposition coatability.

Among the above-described ones, from the viewpoints that the elution of V ions is appropriate, the antirust effect is extremely excellent, and the resistance value is extremely low as conductive particles, the inorganic particles 221 formed of the non-oxide ceramics containing V preferably contain one selected from a group consisting of vanadium monoboride particles (VB particles), vanadium diboride particles ($VB_2$ particles), or vanadium nitride particles (VN particles), or any combination thereof.

Particularly, it is particularly preferable that the inorganic particles 221 formed of the non-oxide ceramics containing V are the vanadium diboride particles ($VB_2$ particles). By making the film portion 22 contain the vanadium diboride particles, the above-described effects of the inorganic particles 221 can be more remarkably obtained. This is because it is presumed that 1) the amount of elution of V ions of the vanadium diboride particles is large, 2) not only V ions but also B ions to be released affect the corrosion resistance, and 3) the valence of the V ions to be eluted affects the corrosion resistance.

In a case where the inorganic particles 221 are the non-oxide ceramics containing V, the amount of the non-oxide ceramics is preferably 1.5% by volume or more with respect to the total solid content of the film portion. In a case where the amount of the non-oxide ceramics containing V is less than 1.5% by volume, there is a case where the effect of suppressing the entering of water due to the elution of the non-oxide ceramics containing V is not sufficiently obtained depending on the configuration of the adhesively joined structure 1. On the other hand, the amount of the non-oxide ceramics containing V is preferably 25.0% by volume or less with respect to the total solid content of the film portion 22. In a case where the amount of the non-oxide ceramics containing V exceeds 25.0% by volume, the cohesive force of the film portion 22 decreases as the proportion of the resin in the film portion 22 decreases. As a result, there is a case where the adhesion strength of the interface between the adhesive layer 4 and the film portion 22 and the interface between the film portion 22 and the metal portion 21 decrease depending on the configuration of the adhesive layer 4 of the adhesive and the configuration of the resin in the film portion 22. The amount of the non-oxide ceramics containing V is more preferably 2.5 to 15.0% by volume with respect to the total solid amount of the film portion 22.

(Ferrosilicon)

Next, the ferrosilicon constituting the inorganic particles 221 will be described. The ferrosilicon has a high reactivity with water. Accordingly, the water, which has entered the interface between the film portion 22 and the adhesive layer 4, reacts with ferrosilicon and is consumed. After the reaction with water, a silicon component of the reaction product of ferrosilicon precipitates and deposits mainly as a silica compound at the interface between the film portion 22 and the adhesive layer 4, and the precipitates and deposits play a barrier function against the entering of water. Such water consumption action and barrier function of the ferrosilicon prevents water from entering the bonding interface between the adhesive layer 4 and the first member 2.

This barrier function prevents water from entering the bonding interface between the adhesive layer 4 and the first member 2, thereby preventing the corrosion of the metal portion 21 and suppressing the unintentional outflow of components of the film portion 22 from the film portion 22. Moreover, with respect to the adhesive layer 4, the water resistance is improved by the precipitates derived from the ferrosilicon, and the deterioration of the adhesive layer 4 mediated by water is also suppressed.

On the other hand, the ferrosilicon is a substance that has an antirust effect by itself and imparts the corrosion resistance to the metal portion 21. However, when water reacts with the ferrosilicon, the antirust effect of ferrosilicon is lost. In a case where the inorganic particles 221 are the ferrosilicon, the film portion 22 may contain an antirust pigment in addition to ferrosilicon. As the film portion 22 contains the antirust pigment, sufficient corrosion resistance can be imparted to the metal portion 21 even in a case where the ferrosilicon is consumed by the reaction with water and the antirust effect is reduced. As the above acts in combination, the bonding durability of the adhesively joined structure 1 is improved.

The chemical composition of the ferrosilicon may be any one containing iron and silicon and is not particularly limited. The chemical composition of the ferrosilicon can be, for example, the composition described in JIS G 2302: 1998. That is, the ferrosilicon may contain, for example, 8.0% to 95% of Si, 3.0% or less of Al, 1.5% or less of P, 0.06% or less of S, 0.20 or less of C, 3.0% or less of Mn, 0.8% or less of Cr, 0.30% or less of Ti in % by mass, and the remainder Fe and impurities. It is particularly preferable that the ferrosilicon contains ferrosilicon containing 75 to 80% by mass of Si, which is defined as JIS No. 2, from the viewpoints of improving the conductivity and the corrosion resistance.

The amount of the ferrosilicon is preferably 10.0% by volume or more with respect to the total solid amount of the film portion. In a case where the amount of the ferrosilicon is less than 10.0% by volume, there is a case where the effect of suppressing the entering of water due to the elution of ferrosilicon, or the like is not sufficiently obtained depending on the configuration of the adhesively joined structure 1. On the other hand, the amount of the ferrosilicon is preferably 60.0% by volume or less with respect to the total solid amount of the film portion 22. In a case where the amount of the ferrosilicon exceeds 60.0% by volume, the cohesive force of the film portion 22 decreases as the proportion of the resin in the film portion 22 decreases. As a result, there is a case where the adhesion strength of the interface between the adhesive layer 4 and the film portion 22 and the interface between the film portion 22 and the metal portion 21 decrease depending on the configuration of the adhesive layer 4 of the adhesive and the configuration of the resin in the film portion 22. The amount of the ferrosilicon is more preferably 20.0 to 45.0% by volume with respect to the total solid amount of the film portion 22.

(Resin)

Additionally, the film portion 22 contains the resin. The resin contained in the film portion 22 functions as a binder for binding the inorganic particles 221 to the metal portion 21 in the film portion 22. The resin contained in the film portion 22 may be either a water soluble or water-dispersible water-based resin that dissolves or disperses in water, or a solvent-based resin that dissolves or disperses in an organic solvent. In a case where the inorganic particles 221 are the non-oxide ceramics containing V, the resin used for the film portion 22 is preferably the water-based resin. In the water-based resin, the polar functional group of the binder resin is adsorbed on the surface of the non-oxide ceramics containing V, so that the non-oxide ceramics containing V can be dispersed in water. Additionally, as the water-based resin is adsorbed on the surface of the non-oxide ceramics containing V, the reaction with water is suppressed, which is preferable. In a case where the inorganic particles 221 are the ferrosilicon, the resin used for the film portion 22 is preferably the solvent-based resin.

(Water-Based Resin)

Examples of the water-based resin include water soluble or water-dispersible resins such as polyester resins, urethane resins, polyolefin resins, acrylic resins, epoxy resins, phenol resins, and mixed resins of two or more kinds of these resins. In a case where the polyester resins are used, the weight-average molecular weight is preferably 10,000 to 30,000. When the molecular weight is less than 10,000, it may be difficult to ensure sufficient workability. On the other hand, when the resin itself exceeds 30,000, the binding sites of the resin itself, the weight-average molecular weight may decrease, and it may become difficult to ensure excellent adhesion to the adhesive layer 4. Additionally, in a case where the weight-average molecular weight exceeds 30,000, when the resin is crosslinked using a curing agent such as melamine, the crosslinking reaction may not be sufficiently performed and the performance of the film portion 22 may deteriorate. In a case where a urethane resin is used, the form of the urethane resin is preferably an emulsion having an emulsion particle size of 10 to 100 nm (preferably 20 to 60 nm). In a case where the emulsion particle size is excessively small, the cost may be high. On the other hand, in a case where the emulsion particle size is excessively large, a gap between the emulsions becomes large when a coating film is applied. Therefore, the barrier property of the film portion 22 may decrease. Examples of the type of the urethane resin include ether-based, polycarbonate-based, and ester-based. These may be used alone or in combination.

(Solvent-Based Resin)

On the other hand, examples of the solvent-based resin include polyester resins, urethane resins, epoxy resins, acrylic resins, and mixed resins of two or more kinds of these resins. In a case where the polyester resins are used as the solvent-based resin, the weight-average molecular weight is preferably 10,000 to 30,000. When the weight-average molecular weight is less than 10,000, it may be difficult to ensure sufficient workability. On the other hand, when the resin itself exceeds 30,000, the binding sites of the resin itself, the weight-average molecular weight may decrease, and it may become difficult to ensure excellent adhesion to the adhesive layer 4.

Here, the resin contained in the film portion 22 may be a crosslinked resin having a crosslinked structure or a non-crosslinked resin having no crosslinked structure. From the viewpoint of low-temperature film formation of the film portion 22, the non-crosslinked resin is preferable. In a case where the crosslinked resin is used, the inorganic particles 221 is easily supported on the film portion 22. As a crosslinking agent (curing agent) for imparting the crosslinked structure to the resin, it is preferable to use an aqueous crosslinking agent for the water-based resin and a solvent-based crosslinking agent for the solvent-based resin. Specifically, the crosslinking agent is preferably melamine, isocyanate, a silane compound, a zirconium compound, a titanium compound, or the like.

The amount of the crosslinking agent added is preferably 5 parts by mass to 30 parts by mass with respect to 100 parts by mass of the resin solid content. When the amount of the crosslinking agent added is less than 5 parts by mass, the crosslinking reaction with the resin decreases, and the performance as a coating film may be insufficient. On the other hand, when the amount of the crosslinking agent added is more than 30 parts by mass, the crosslinking reaction proceeds too much, the film portion 22 becomes excessively hard, and the workability deteriorates. Particularly, in a case where the crosslinking agent is the silane compound, the zirconium compound, or the titanium compound, the coating stability may further deteriorate when the amount of the crosslinking agent added is more than 30 parts by mass.

The amount of the resin is preferably 10.0 to 99.0% by volume with respect to the total solid amount of the film portion 22. In a case where the resin content is less than 10.0% by volume, the function as the binder is not developed, the cohesive force of the film portion 22 decreases, and when an adhesion test and forming work are performed, the fracture inside the coating film (cohesive fracture of the coating film) may occur easily. When the resin content exceeds 99.0% by volume, the proportion of a pigment component contained in the film portion 22, particularly the inorganic particles 221 becomes small, and depending on the configuration of the adhesively joined structure 1, it may be difficult to sufficiently increase the bonding durability. The amount of the resin is more preferably 15.0 to 75.0% by volume with respect to the total solid amount of the film portion 22.

(Conductive Particles)

The film portion 22 may further contain the conductive particles in addition to the inorganic particles 221. The conductive particles contribute to the improvement of the weldability by imparting conductivity to the film portion 22. The conductive particles contained in the film portion 22 are not particularly limited, and are, for example, doped oxide particles, non-oxide ceramic particles (not containing V), iron alloy particles, stainless steel particles, and particles other than iron alloys (metal particles, metal alloy particles, and the like) and the like. Particularly, since the doped oxide particles impart conductivity to the film portion 22, and improve the adhesion between the film portion 22 and the adhesive layer 4 and the adhesion between the film portion 22 and the metal portion 21, the doped oxide particles are preferable.

(Doped Oxide Particles)

Examples of the doped oxide particles include doped zinc oxide particles and doped tin oxide particles. The conductive particles preferably contain the doped zinc oxide particles from the viewpoints of the effect of improving the conductivity and the adhesion between the film portion 22 and the adhesive layer 4.

Specifically, when doped zinc oxide is taken as an example, examples of the doped oxide particles include particles obtained by doping one element (hereinafter also referred to as a "doping element") selected from a group consisting of the elements of Group 13 of the Periodic Table or the elements of Group 15 of the Periodic Table, or any combination thereof into oxide particles to develop the conductivity.

Additionally, examples of the elements of Group 13 of the Periodic Table include B, Al, Ga, In, and the like. Examples of the elements of Group 15 of the Periodic Table include P, As, Sb, and the like. Among these, Al, Ga, and Sb are preferable as the doping elements from the viewpoint of improving the conductivity. Moreover, regarding zinc oxide, Al is more preferable from the viewpoint of cost.

Examples of the tin oxide include antimony-doped tin oxide (ATO), phosphorus-doped tin oxide (PTO), niobiumdoped tin oxide (NbTO), tantalum-doped tin oxide (TaTO), fluorine-doped tin oxide (FTO), and the like.

The amount of the doping element is preferably 0.05 to 5 atom % and more preferably 0.1 to 5 atom % with respect to undoped oxide particles from the viewpoint of improving the conductivity.

(Non-Oxide Ceramic Particles (not Containing V))

The non-oxide ceramic particles (not containing V) are not particularly limited but are preferably non-oxide ceramics (boride ceramics, carbide ceramics, nitride ceramics, suicide ceramics, and the like) of which the electric resistivity (volume resistivity, specific resistance) at 25° C. is in a range of $0.1 \times 10^{-6}$ to $185 \times 10^{-6}$ Ωcm.

(Iron Alloy Particles)

The iron alloy particles are, for example, alloy particles of iron and one alloy selected from a group consisting of Si, V, Mn, W, Mo, Ti, Ni, or Nb, or any combination thereof. Examples of iron alloy powder include ferrovanadium, ferromanganese, ferrotungsten, ferromolybdenum, ferrotitanium, ferronickel, ferroboron, ferroniobium, and the like, excluding the ferrosilicon.

Among these, ferrovanadium and ferromanganese are preferable as the iron alloy particles from the viewpoints of the corrosion resistance as well as the weldability.

(Stainless Steel Particles)

The stainless steel particles are, for example, alloy particles in which Fe contains 10.5% by mass or more of Cr (however, alloy particles having a C content of 1.2% by mass or less).

The particle shape of the conductive particles is not particularly limited but is preferably, for example, a sphere-like shape such as a spherical shape, a pseudo-spherical shape (for example, an elliptical spherical shape, a chicken egg shape, a rugby ball shape, or the like), or a polyhedral shape (for example, a soccer ball shape, a dice shape, brilliant-cut shapes of various jewels). The conductive particles having the sphere-like shape are uniformly dispersed in the film portion 22 and easily form an effective energizing path that penetrates in the thickness direction of the film portion 22. As a result, the joinability of the first member 2 is further improved.

The average particle size of the conductive particles is not particularly limited, but is preferably 0.2 to 5 μm and more preferably 0.5 to 2.5 μm. In a case where the average particle size of the conductive particles is in a range of 0.2 to 5 μm, it is easy to form an effective energizing path that penetrates in the thickness direction of the film portion 22, and the weldability of the first member 2 is further improved.

The amount of the conductive particles is, for example, 3 to 45% by volume with respect to the total solid content of the film portion 22. In a case where the amount of the conductive particles is less than 3% by volume, the weldability between the first member 2 and the second member 3 cannot be sufficiently obtained. In a case where the amount of the conductive particles exceeds 45 vol %, the adhesion with the adhesive layer 4 with a decrease in the cohesive force of the film portion 22 deteriorates. The amount of the conductive particles is preferably 10 to 20% by mass with respect to the film portion 22.

(Antirust Pigment)

Another component that is preferably further contained in the film portion 22 is the antirust pigment. When the antirust pigment is contained in a state where the inorganic particles 221 are contained in the film portion 22, the corrosion resistance and the bonding durability are further improved. Particularly, when the antirust pigment is contained in a case where the ferrosilicon is contained in the film portion 22 as the inorganic particles 221, the corrosion resistance is improved over a long period of time, and the bonding durability is further improved.

The antirust pigment is not particularly limited but is a vanadium-based antirust pigment, a silica-based antirust pigment, a phosphate-based antirust pigment, a silicate-based antirust pigment (calcium silicate or the like), a molybdate-based antirust pigment (calcium molybdate, aluminum molybdate, barium molybdate, or the like), a chromium-based antirust pigment (strontium chromate, potassium chromate, barium chromate, calcium chromate, or the like), or the like, which may be used alone or a combination of two or more may be used.

Examples of the vanadium-based antirust pigment include vanadium oxide ($V_2O_3$) and composite oxides of V and Mn, Ca, Zn, Mg, Al, Ti, Zr, Ca, Mo, Fe, Ce, and Sr (for example, $Mn_2O_3$ and $V_2O_3$, CaO and $V_2O_3$, and the like).

Examples of the silica-based antirust pigment include magnesium ion-exchanged silica, calcium ion-exchanged silica, and amorphous silica having an oil absorption amount of 100 to 1000 ml/100 g, a specific surface area of 200 to 1000 m$^2$/g, and an average particle size of 2 to 30 μm, and the like.

In addition, the oil absorption amount of silica can be measured according to JIS K 5101-13-2. The specific surface area of silica can be measured by the BET method. The average particle size of silica can be measured by the same method as the average particle size of inorganic particles 221.

Examples of the phosphate-based antirust pigment include aluminum tripolyphosphate, Zn, Mg, Al, Ti, Zr, Ca, Mo, Fe, Ce and Sr salts of phosphate and phosphite (for example, zinc phosphate, magnesium phosphate, magnesium dibasic phosphate, aluminum phosphate, calcium phosphate, calcium phosphomolybate, aluminum phosphomolybate, zinc phosphite, strontium phosphite, calcium phosphite, aluminum phosphite, and the like), hydrocalmite-treated phosphate compounds (for example, EXPERT NP-530 N5 made by TOHO PIGMENT, which are subjected to a hydrocalmite treatment of zinc phosphate), and the like.

Among these, the antirust pigment is preferably the phosphate-based antirust pigment (aluminum tripolyphosphate, hydrocalmite-treated phosphate compounds, or the like), the silica-based antirust pigment, or a combination of both from the viewpoint of achieving both corrosion resistances of a defective portion and a flat portion. Particularly, the antirust pigment is more preferably one selected from a group consisting of aluminum tripolyphosphate, hydrocalmite-treated phosphate compound, Ca-exchanged silica, or amorphous silica having an oil absorption amount of 100 to 1000 ml/100 g, a specific surface area of 200 to 1000 m$^2$/g, and an average particle size of 2 to 30 μm.

Additionally, in a case where the inorganic particles 221 are ferrosilicon, it is preferable to use the silica-based antirust pigment. After the ferrosilicon reacts with water in the film portion 22, silicon derived from ferrosilicon can precipitate from the silica-based antirust pigment. Therefore, the barrier function can be more reliably exhibited.

Here, in a case where the film portion 22 contains the doped zinc oxide particles, the antirust pigment preferably contains an antirust pigment containing Mg. When the film portion 22 contains the doped zinc oxide particles and the antirust pigment containing Mg, the corrosion resistance is further improved. This is because it is presumed that the corrosion resistance can be improved as the doped zinc oxide reacts with Mg in the antirust pigment to form a poorly soluble composite oxide.

Examples of the antirust pigment containing Mg include a magnesium-treated product of aluminum tripolyphosphate, magnesium ion-exchanged silica, magnesium phosphate, and the like. Among these, a magnesium-treated product of aluminum tripolyphosphate is preferable from the viewpoint of improving the corrosion resistance.

The amount of the antirust pigment containing Mg when used in combination with the doped zinc oxide particles is preferably 5.0 to 20.0% by volume with respect to the total solid content of the film portion 22. In a case where the amount of the antirust pigment containing Mg is less than 5.0% by volume, there is a case where the effect of improving the corrosion resistance is not obtained by the combined use with the antirust pigment containing Mg. On the other hand, in a case where the amount of the antirust pigment containing Mg exceeds 20.0% by volume, the proportion of the inorganic particles in the film portion 22 decreases, and the bonding durability becomes insufficient.

The amount of the antirust pigment is preferably 5.0 to 40.0% by volume with respect to the total solid amount of the film portion 22. In a case where the amount of the antirust pigment is less than 5.0% by volume, the effect of improving the corrosion resistance and the bonding durability may not be obtained. In a case where the amount of the antirust pigment exceeds 40.0% by volume, the workability of the film portion 22 and the cohesive force may decrease. The amount of the antirust pigment is more preferably 10.0 to 30.0% by volume.

(Other Components)

The film portion 22 may contain other additives in addition to the above components. Examples of other additives include well-known additives such as oxide particles, extender pigments, solid lubricants, antirust agents, leveling agents, viscosity-imparting agents, pigment sedimentation inhibitors, and defoamers.

Additionally, the average thickness of the film portion 22 is not particularly limited but is, for example, 1 µm to 20 µm, preferably 1 µm to 10 µm, and more preferably 1 µm to 5 µm. In a case where the average thickness of the film portion 22 is 1 µm or more, the inorganic particles 221 can be stably present in the film portion 22, and the bonding durability is improved. Additionally, in a case where the average thickness of the film portion 22 is 1 µm or more, the adhesion between the film portion 22 and the adhesive layer 4 is sufficiently excellent. Additionally, in a case where the average thickness of the film portion 22 is 5 µm or less, the inorganic particles 221 are more likely to protrude from the film portion 22, and the effect of preventing the entering of water into the bonding interface between the adhesive layer 4 and the first member 2 due to the above-described inorganic particles 221 is sufficiently obtained, and the bonding durability of the adhesively joined structure 1 is much further improved. Additionally, the electric resistance of the film portion 22 can be reduced, and spot welding can also be stably performed.

Particularly, in a case where the average thickness of the film portion 22 is 1µ to 5 µm and the average particle size of the inorganic particles 221 is 1.5 µm to 6 µm, the inorganic particles 221 easily protrude much further from the film portion 22. As a result, the effect of preventing water from entering the bonding interface between the adhesive layer 4 and the first member 2 due to the above-described inorganic particles 221 is sufficiently obtained, and the bonding durability of the adhesively joined structure 1 is much further improved.

(Relationship Between Average Particle Size of Inorganic Particles 221 and Average Thickness of Film Portion 22)

The average particle size/average thickness, which is the ratio of the average thickness of the film portion 22 to the average particle size of the inorganic particles 221, is preferably 0.3 to 1.5, more preferably 0.90 to 1.5, and much more preferably 1.0 to 1.5. In a case where the above ratio is less than 0.3, the inorganic particles 221 may not protrude depending on the configuration of the film portion 22. On the other hand, in a case where the ratio exceeds 1.5, there is a case where the inorganic particles 221 may be more likely to be separated from the film portion 22 due to an external load depending on the configuration of the film portion 22 and the adhesive layer 4.

In addition, the average thickness of the film portion 22 can be measured as follows. First, by cutting the part of the adhesively joined structure 1 on which the film portion 22 is disposed, the cross section of the portion is exposed, the cross section of the portion is further polished, and a cross sectional sample in the thickness direction of the first member 2 of the film portion 22 is obtained. Next, the portion of the film portion 22 of the cross sectional sample is observed with a scanning electron microscope to obtain an observation image of the cross section of the film portion 22. The thickness of the film portion 22 present in the visual field of the observation image is measured, and the average value thereof is calculated to obtain the average thickness of the film portion 22.

Additionally, a known chemical film or electrodeposition coating film may be formed in the part of the above-described first member 2 that does not come into contact with the adhesive layer 4. In this case, since the non-oxide ceramics containing V and the ferrosilicon have conductivity, the film portion 22 can be electrodeposited and coated even via the film portion 22.

[1.2. Second Member 3]

In the present embodiment, the second member 3 is a metal member as described above and has a metal portion 31 and a film portion 32 formed on at least a part of the surface of the metal portion 31.

Since the configurations of the metal portion 31 and the film portion 32 can be the same as the configurations of the metal portion 21 and the film portion 22 of the first member 2, a description thereof will be omitted.

Additionally, the film portion 32 has inorganic particles 321 that protrude toward the adhesive layer 4. Accordingly, the same effect as that of the inorganic particles 221 in the first member 2 can be obtained by the inorganic particles 321. The inorganic particles 321 are formed of the ferrosilicon or the non-oxide ceramics containing V, similar to the inorganic particles 221.

That is, first, the water consumption action and barrier function of the inorganic particles 321 prevent water from entering the bonding interface between the adhesive layer 4 and the second member 3. Then, by preventing water from entering the bonding interface between the adhesive layer 4 and the second member 3, corrosion of the metal portion 31 is prevented, and unintentional outflow of the components of the film portion 32 from the film portion 32 are also suppressed. Moreover, with respect to the adhesive layer 4, the water resistance is improved by the precipitates derived from inorganic particles 321, and the deterioration of the adhesive layer 4 mediated by water is also suppressed. As the above acts in combination, the bonding durability of the adhesively joined structure 1 is much further improved.

[1.3. Adhesive Layer 4] The adhesive layer 4 is disposed between the first member 2 and the second member 3 in the joining region 5 and bonds the first member 2 and the second member 3 to each other.

The adhesive layer 4 is mainly constituted of an adhesive. The above-described effect of the film portion 22 is not impaired depending on the type of adhesive constituting the adhesive layer 4. Therefore, the adhesive that can be used for the adhesive layer 4 is not particularly limited. For example, an epoxy resin-based adhesive, a polyester resin-based adhesive, a urethane resin-based adhesive, an adhesive obtained by mixing these adhesives with rubber or elastomer, an adhesive to which conductivity is imparted, or the like can be used. Among the above-described ones, from the viewpoint of initial bonding strength, the adhesive layer 4 preferably contains the epoxy resin-based adhesive or the urethane resin-based adhesive.

Additionally, it is preferable that the resin of the adhesive constituting the adhesive layer 4 has a common chemical structure with that of the resin in the film portion 22 and/or the film portion 32. Accordingly, the initial adhesion between the adhesive layer 4 and the film portion 22 and/or the film portion 32 can be much further improved, and the bonding strength of the adhesively joined structure 1 can be much further increased.

For example, the resin of the adhesive constituting the adhesive layer 4 may have a common main skeleton with the resin in the film portion 22 and/or the film portion 32. Alternatively, the resin of the adhesive constituting the adhesive layer 4 may have a common side chain functional group common with the resin in the film portion 22 and/or the film portion 32.

Additionally, the adhesive layer 4 may contain inorganic particles formed of the ferrosilicon or the non-oxide ceramics containing V. Accordingly, the entered water can be consumed, the water resistance of the adhesive layer 4 can be improved, and the bonding durability of the adhesively joined structure 1 can be much further increased.

The amount of the inorganic particles formed of ferrosilicon the non-oxide ceramics containing V in the adhesive layer 4 is not particularly limited but is, for example, 1.0% by volume to 20% by volume and preferably 2.0% by volume to 10.0% by volume with respect to the total solid content of the adhesive layer 4. Accordingly, the bonding durability of the adhesively joined structure 1 can be much further increased while making the bonding strength between the first member 2 and the second member 3 sufficient.

Additionally, since the configuration of the inorganic particles formed of the ferrosilicon or the non-oxide ceramics containing V in the adhesive layer 4 can be the same as that of the inorganic particles 221 in the film portion 22, a detailed description thereof will be omitted.

The adhesively joined structure 1 according to the embodiment of the present invention has been described in detail above. According to the present embodiment, the inorganic particles 221 and the inorganic particles 321 in the film portion 22 and the film portion 32 suppress the entering of water into the interface between the first member 2 and the adhesive layer 4 and the entering of water into the interface between the second member 3 and the adhesive layer 4. As a result, the deterioration of the adhesive layer 4 and the corrosion of the first member 2 and the second member 3 are suppressed. For this reason, the decrease in bonding strength of the adhesively joined structure 1 is suppressed. That is, the adhesively joined structure 1 is excellent in bonding durability.

2. Modification Example

The embodiment of the present invention has been described above. Hereinafter, some modification examples of the above embodiment of the present invention will be described. In addition, respective modification examples described below may be applied alone to the above embodiment of the present invention or may be applied in combination to the above embodiment of the present invention. Additionally, the respective modification examples may be applied instead of the configuration described in the above embodiment of the present invention or may be additionally applied to the configuration described in the above embodiment of the present invention. Hereinafter, the differences between the above-described embodiment and the respective modification examples will be mainly described, and the same matters will be appropriately omitted.

Figure 4:
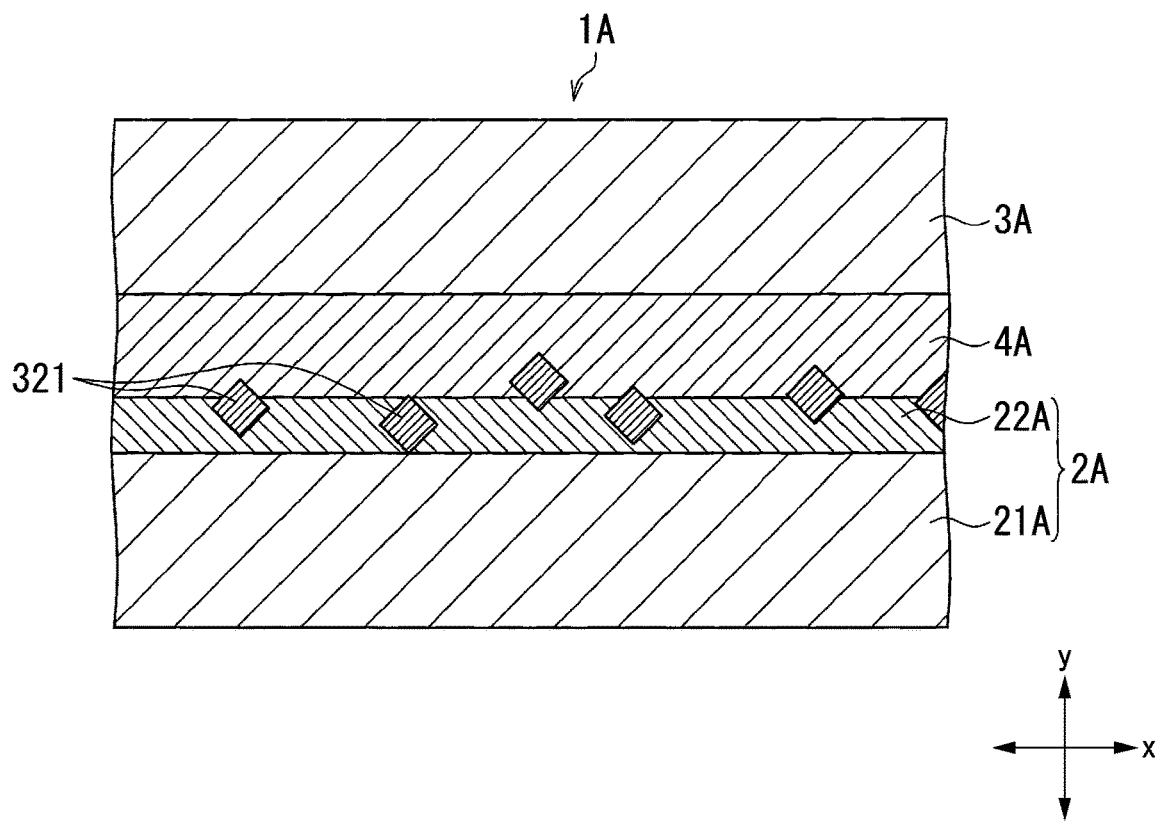
FIG. 4 is a partially enlarged cross sectional view illustrating a joining region of an adhesively joined structure according to a modification example of the present invention.

For example, in the above description, the second member 3 has been described to have the film portion 32, and the film portion 32 has been described as the film portion 32 containing the inorganic particles 321. However, the present invention is not limited to this example. For example, the second member 3 may not have the above-described film portion 32. FIG. 4 is a partially enlarged cross sectional view illustrating a joining region of an adhesively joined structure according to a modification example of the present invention.

An adhesively joined structure 1A illustrated in FIG. 4 has a first member 2A and a second member 3A, and the first member 2A and the second member 3A are bonded to each other by an adhesive layer 4A. The first member 2A has a metal portion 21A, and a film portion 22A formed on the surface of the metal portion 21A. The film portion 22A has a resin and the inorganic particles 321, and a part of the film portion 22A protrudes toward the adhesive layer 4A.

The second member 3A is a member bonded to the first member 2A via the adhesive layer 4A. And, unlike the above-described embodiment, the second member 3A does not have the film portion 32. In this case, the second member 3A can be constituted of any material.

For example, examples of the material that can be used for the second member 3A includes fiber reinforced plastics (FRPs) in which a resin material and a reinforcing fiber are contained in a matrix resin and made composite, ceramics materials, and the like in addition to the material of the above-described metal portion 21. Additionally, examples of the reinforcing fiber used in the fiber reinforced plastics include glass fiber, carbon fiber, and the like.

Even in the above case, since the adhesively joined structure 1A has the film portion 22A, and the inorganic particles 321 in the film portion 22A protrude from the film portion 22A toward the adhesive layer 4A, the adhesively joined structure 1A has excellent bonding durability as compared to an adhesively joined structure that does not have the film portion 22A.

Figure 5:
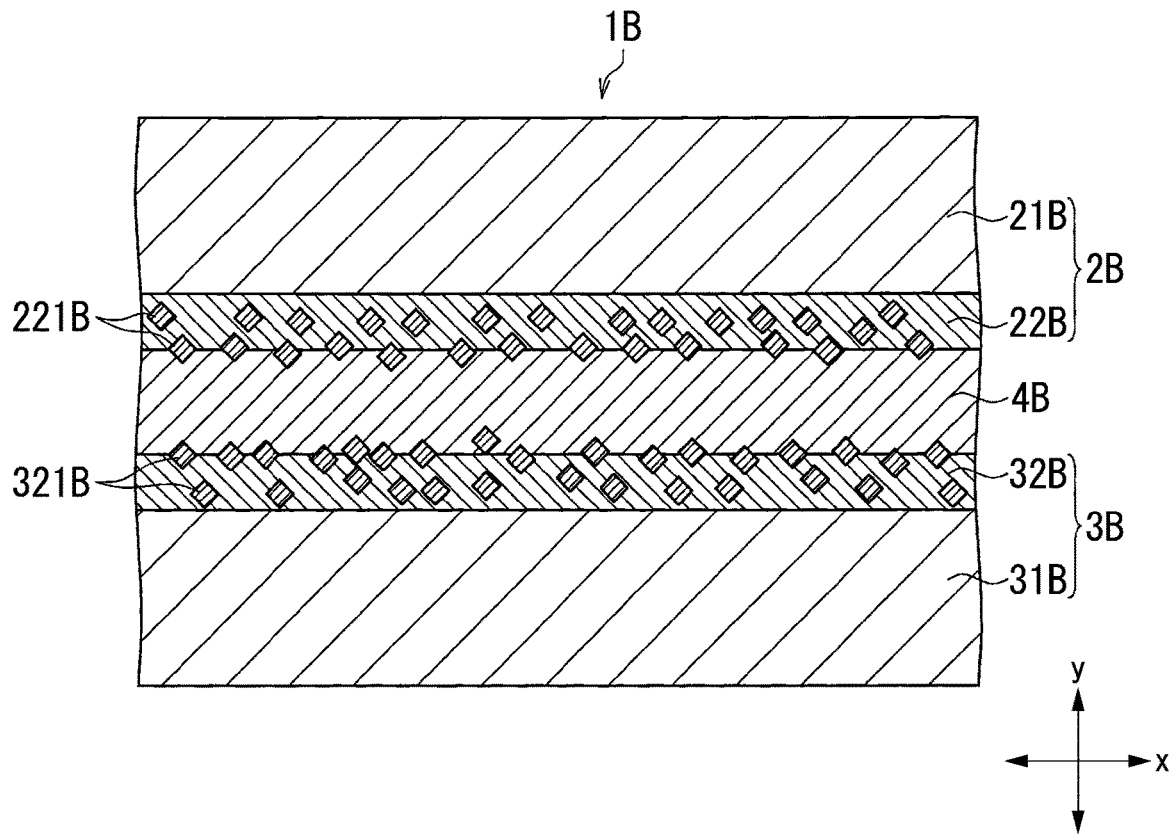
FIG. 5 is a partially enlarged cross sectional view illustrating a joining region of an adhesively joined structure according to a modification example of the present invention.

Additionally, for example, a case where the inorganic particles 321 are relatively large with respect to the average thickness of the film portion 22 has been described in the above-described illustrated embodiment. However, the present invention is not limited to this. FIG. 5 is a partially enlarged cross sectional view illustrating a joining region of an adhesively joined structure according to a modification example of the present invention.

The adhesively joined structure 1B has a first member 2B and a second member 3B, and the first member 2B and the second member 3B have metal portions 21B and 31B and film portion 22B and 32B, respectively. Also, the first member 2B and the second member 3B are bonded to each other via the film portion 22B, an adhesive layer 4B, and the film portion 32B.

Also, the film portions 22B and 32B contain resin and inorganic particles 221B and 321B, respectively, and some of the inorganic particles 221B and 321B protrude toward the adhesive layer 4B.

Here, the average particle size of the inorganic particles 221B and 321B is 0.5 times or less the average thickness of the film portions 22B and 32B. Even in such a case, as long as some of the inorganic particles 221B and 321B protrude toward the adhesive layer 4B, the effects of the present invention as described above can be obtained. In addition, in order for some of the inorganic particles 221B and 321B to protrude toward the adhesive layer 4B in this way, for example, the concentration of the inorganic particles 221B and 321B can be appropriately increased.

Figure 6:
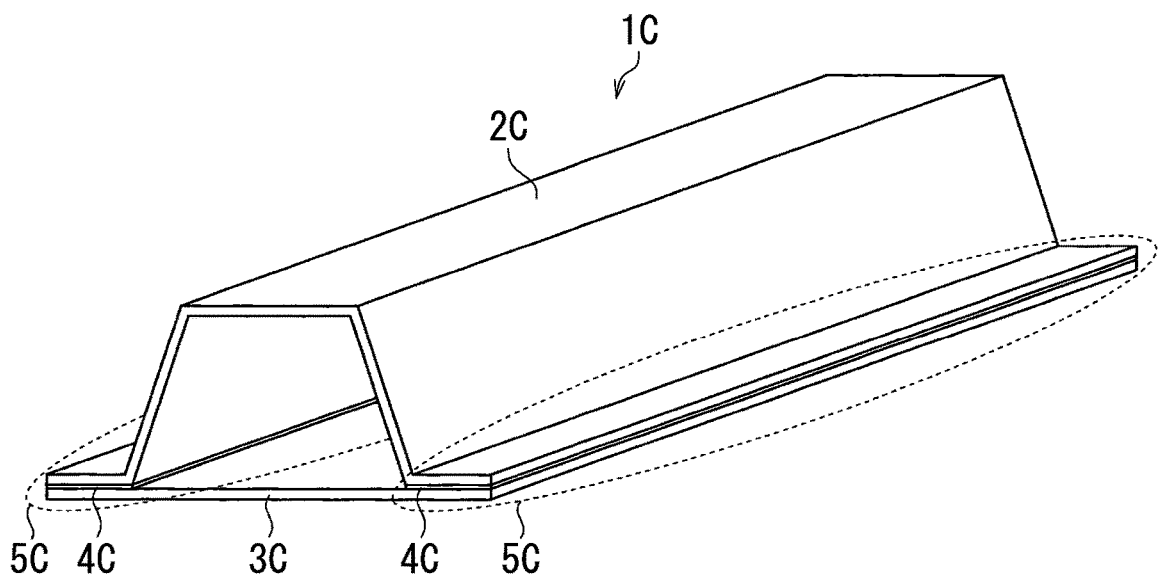
FIG. 6 is a schematic perspective view of an adhesively joined structure according to another modification example of the present invention.
Figure 7:
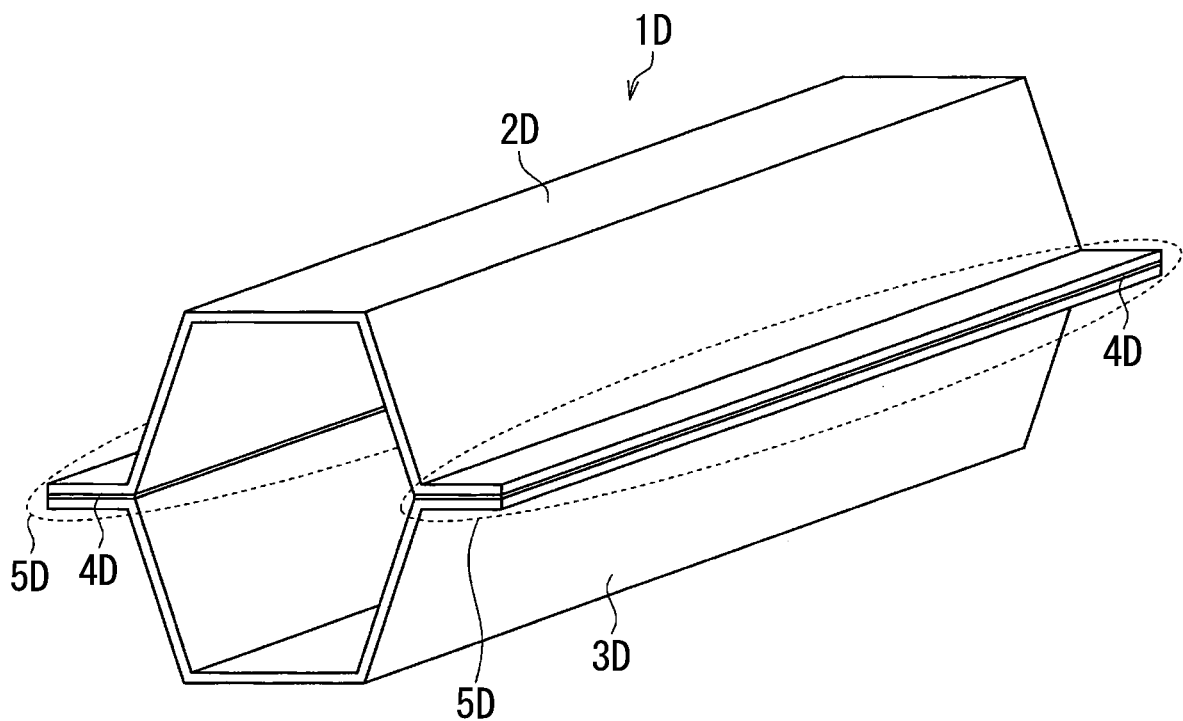
FIG. 7 is a schematic perspective view of an adhesively joined structure according to another modification example of the present invention.

Additionally, the shape of the adhesively joined structure according to the present invention is not limited to the above-described embodiment. The shapes of the first member and the second member constituting the adhesively joined structure according to the present invention can be any shapes, and any part can also be selected as the joining part between the first member and the second member. Moreover, the adhesively joined structure according to the present invention may have members other than the first member and the second member. FIGS. 6 and 7 are schematic perspective views of an adhesively joined structure according to another modification example of the present invention, and FIG. 8 is a schematic view illustrating a bonded state of the adhesively joined structure according to another modification example of the present invention.

An adhesively joined structure 1C illustrated in FIG. 6 has a hat-type first member 2C and a flat-plate-shaped second member 3C, and the second member 3C is bonded in a joining region 5C on a flange portion of the first member 2C via the adhesive layer 4C. An adhesively joined structure 1D illustrated in FIG. 7 has a hat-type first member 2D and a hat-type second member 3D, and these members are disposed such that flange portions thereof face each other. The facing flange portions of the first member 2D and the second member 3D are bonded to each other via an adhesive layer 4D to form a joining region 5D. Moreover, in an adhesively joined structure 1E illustrated in FIG. 8, the second member 3E covers an end portion of a plate-shaped portion of the first member 2E by hem folding to form a hem portion. Also, in the hem portion, the first member 2E and the second member 3E are bonded to each other via an adhesive layer 4E.

Figure 8:
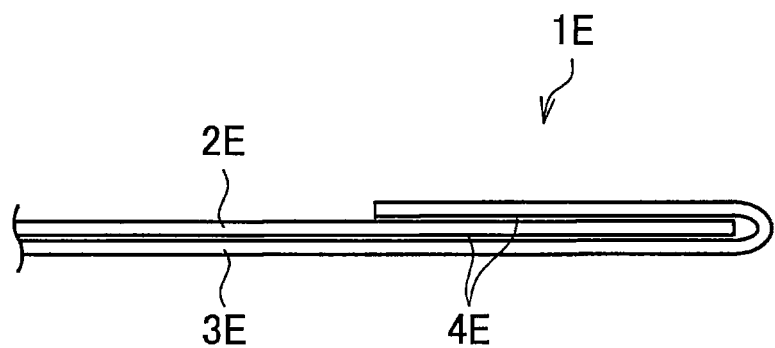
FIG. 8 is a schematic view illustrating a joined state of an adhesively joined structure according to another modification example of the present invention.

In any of the modification example illustrated in FIGS. 6 to 8, a film portion containing a resin and inorganic particles is formed on the surface of the first members 2C to 2E in contact with the adhesive layers 4C to 4E, and the inorganic particles protrude from the film portion toward the adhesive layers 4C to 4E. Accordingly, the adhesively joined structures 1C to 1E are excellent in bonding durability.

In addition, in the above description of the modification examples, a case where a first member has a metal portion has been described. However, a second member may have a metal portion in addition to the first member. The adhesively joined structure of the present invention is not limited to the shape and has excellent bonding durability.

Moreover, in the above-described embodiment, a case where the first member 2 and the second member 3 are bonded to each other only by the adhesive layer 4 has been described. However, the present invention is not limited to this, and adhesive joining by the adhesive layer 4 can be combined with other joining methods.

The joining methods that can be combined with the adhesive joining is not particularly limited, and any joining methods can be adopted. Specifically, examples of such joining methods include melt joining, non-melt joining, mechanical joining, and the like.

Examples of the melt joining include spot welding, arc welding, laser welding, and the like. The melt joining can be applied to a case where the first member and the second member have a metal portion. In addition, the melt joining may be performed by removing an adhesive layer. However, in a case where the adhesive layer has conductivity, the melt joining can be performed without removing the adhesive layer.

Examples of the non-melt joining include friction stir joining, diffusion joining, pressure welding, and the like. Examples of the mechanical joining include rivet joining and screw joining.

3. Method of Manufacturing Adhesively Joined Structure

Next, a method of manufacturing the adhesively joined structure according to each embodiment of the present invention will be described.

The method of manufacturing the adhesively joined structure according to the present embodiment includes a member forming step of forming each of the first member 2 and the second member 3 constituting the adhesively joined structure 1, and an adhesively joining step of joining the formed first member 2 and second member 3 to each other using an adhesive.

[3.1 Member Forming Step]

The member forming step includes a base metal manufacturing step of manufacturing base metals 3 of the first member 2 and the second member using the materials of the first member 2 and the second member 3; a film portion forming step of forming the film portion 22 by applying a film coating liquid for forming the film portion 22 to at least a part of the metal portion 21 of a base metal serving as at least the first member 2 and then performing drying or baking; and a forming step of forming the base metal of the first member 2 in which the film portion 22 is formed and a base metal of the second member 3 in a desired shape as necessary.

(Base Metal Manufacturing Step)

In the base metal manufacturing step, the base metals of the first member 2 and second member 3 are manufactured using the articles serving as the materials of the first member 2 and the second member 3. The method of manufacturing the base metals is not particularly limited, and the base metals may be manufactured in accordance with usual methods by using various known manufacturing methods used to form desired base metals.

For example, in a case where the zinc-plated steel sheets are used as the first member 2 and the second member 3, hot-rolled steel sheets or cold-rolled steel sheets are manufactured in accordance with the usual methods, and zinc-plated layers may be formed on the hot rolled steel sheets or cold-rolled steel sheets in accordance with the usual methods. Additionally, even in a case where other metal materials, resin materials, FRP materials, ceramic materials, and the like are used as the base metals, various known manufacturing methods are used, and the other metal materials, resin materials, FRP materials, ceramics, and the like may be manufactured in accordance with the usual methods.

In addition, after the base metal manufacturing step is completed, various known coating base material treatments may be performed on a metal member serving as the first member 2 prior to performing the film portion forming step in the subsequent stage. As methods of such coating base material treatments, various known treatment methods can be appropriately used. Examples of such treatment methods include an immersion drying method, an immersion, water washing, and drying method, a spraying, water washing, and drying method, an applying and drying method, an applying, drying, and curing method, and the like. Additionally, the coating method is not particularly limited, and various known coating methods such as immersion, brush coating, spraying, roll coater, bar coater, and blade coater can be used.

(Film Portion Forming Step)

In the film portion forming step, the film portion 22 is formed as the film coating liquid for forming the film portion 22 is applied to at least a part of the metal portion 21 of the base metal serving as the first member 2, and then drying or baking is performed. In addition, in a case where the second member 3 is a metal member, it is preferable to treat the second member 3 similarly.

Here, the method of manufacturing the film coating liquid is not particularly limited, and a solvent according to a resin to be used, such as water, may be used, and the resin, the inorganic particles 221 and, as necessary, raw materials such as antirust pigments and conductive particles are used in the solvent may be blended in a desired solid content mass ratio, and maybe mixed and stirred by various known methods. In addition, in a case where the viscosity of the film coating liquid in order to control the protruding state of the inorganic particles, the viscosity can be adjusted by adding a known thickener or the like.

The method of applying the film coating liquid for forming the film portion 22 is not particularly limited, and various known methods can be appropriately used. For example, in a case where the film coating liquid is a viscous liquid, the film coating liquid is applied by using known methods such as coating by a discharge method from a slit nozzle or a circular nozzle, brush coating, plate coating, spatula coating, and the like. Additionally, in a case where a film coating liquid in which the above components are dissolved in a predetermined solvent is used, for example, various known coating methods such as brush coating, spray coating, bar coater, discharge coating from nozzles of various shapes, die coater coating, curtain coater coating, roll coater coating, ink jet coating, and the like can be used. In addition to that, various known methods such as screen printing and powder coating can be adopted.

Additionally, the drying or baking can be performed by, for example, heat treatment or the like. The heating conditions are not particularly limited, and for example, the drying or baking time can be 5 seconds or longer to 30 minutes or shorter under the temperature conditions of 80° C. or higher and 250° C. or lower.

Additionally, in the present step, the methods of making the inorganic particles 221 protrude from the film portion 22 are not particularly limited but includes methods of making the mode particle size of the inorganic particles 221 relatively small with respect to the film thickness of the film portion 22 to be formed, controlling the viscosity and surface energy of the film coating liquid, controlling the amount of the inorganic particles 221 in the film coating liquid, applying and drying the film coating liquid in a plurality of times, and applying a thin film coating liquid in the vicinity of the surface of the film portion 22 to be formed. These methods may be used alone or in combination. It is preferable to control the mode diameter in order to make the inorganic particles 221 having a particle size smaller than the film thickness of the film portion protrude from the surface of the film portion. When the mode diameter of the inorganic particles 221 is 1.0 time or less the film thickness of the film portion, the average presence number of the protruding particles having a particle size equal to or less than the film thickness of the film portion per 500 μm increases, and the bonding durability can be improved. Here, the mode diameter in the particle size distribution refers to the particle size corresponding to the most frequent value.

(Forming Step)

In the forming step, the base metal of the first member 2 in which the film portion 22 is formed, and the base metal of the second member 3 is formed into a desired shape as necessary. Here, the forming method is not particularly limited and a processing method for obtaining the desired shape of a formed article may be selected from known metal processing methods. Additionally, as necessary, a part of the forming step and an adhesively joining step to be described below may be simultaneously performed. The film portion 22 of the present embodiment can maintain a state in which the inorganic particles 221 protrude from the film portion 22 even when the drawing is performed.

<Adhesively Joining Step>

The adhesively joining step is a step of joining the formed first member 2 and the second member 3 with an adhesive. In the present step, first, a desired adhesive is disposed on the portions to be joined (for example, the flange portions) in the obtained first member 2 and the second member 3 to form the joining region 5. Then, the first member 2 and the second member 3 are stacked via the joining region 5, and then the adhesive is cured by holding at room temperature or heat treatment. Here, the method of disposing the desired adhesive is not particularly limited, and a desired adhesive may be applied or a desired adhesive resin sheet may be disposed. Accordingly, it is possible to obtain the adhesively joined structure 1 according to the present embodiment, in which the first member 2 and the second member 3 are adhesively joined to each other via the adhesive layer 4.

In addition, in the above adhesively joining step, various coating treatments and other joining treatments may be performed, as necessary. For example, as the joining treatment, mechanical joining using bolting or riveting, welding processing such as spot welding, or the like may be performed.

For example, in a case where the adhesively joined structure 1D illustrated in FIG. 7 is manufactured, the adhesively joined structure 1E can be obtained by applying an adhesive to one side or both sides of a flange portion that joins the formed first member 2 and the second member 3 and stacking the joined portions of the first member 2 and the second member 3 via the adhesive, and curing the adhesive by holding at room temperature or heat treatment of the adhesive.

Additionally, for example, in a case where the first member 2 serving as the metal member is reinforced by the second member 3 serving as a fiber reinforced plastic as in the adhesively joined structure 1 illustrated in FIG. 1, the adhesively joined structure 1 can be obtained by performing warm-forming in a state in which the first member 2 and the second member 3 are stacked via the adhesive.

The method of manufacturing the adhesively joined structure according to the present embodiment has been briefly described above. In addition, the adhesively joined structure according to the present invention is not limited to the adhesively joined structure manufactured by the above-described manufacturing method and can be manufactured by any manufacturing method.

4. Applications

Next, the applications of the adhesively joined structure according to the present invention will be described. The applications of the adhesively joined structure according to the present invention is not particularly limited, and the adhesively joined structure can be used as a member of any machine, building, structure, or the like. Particularly, the adhesively joined structure according to the present invention is excellent in water resistance and adhesiveness and is relatively lightweight because the adhesive is used. Therefore, the adhesively joined structure according to the present invention is easily placed in an environment in contact with water and is suitable for components for transportation equipment, particularly components for a vehicle, for which weight reduction is always required. Therefore, the present invention also relates to a component for a vehicle including the adhesively joined structure according to the present invention in one aspect thereof.

The component for a vehicle to which the adhesively joined structure according to the present invention is applied is not particularly limited and includes, for example, a closed cross sectional member bonded with a flange (for example, an A pillar, a B pillar, a side sill, and the like), members in which materials are partially stacked for the purpose of reinforcement, stiffening, and the like (for example, a B pillar reinforcement, an outer panel), panel members having a hem-processed portion (a door, a hood, and the like), and the like.

EXAMPLES

Example 1

Hereinafter, the present invention will be described in more detail with reference to Examples. In addition, the examples to be described below are merely examples of the present invention, and the present invention is not limited thereto.

[Manufacturing of Adhesively Joined Structure]
1. Preparation of Metal Sheet

The following zinc-plated steel sheets GA and aluminum sheets were prepared and immersed in an aqueous solution of 2.5% by mass of an aqueous alkaline degreasing agent (FC-301 made by NIHON PARKERIZING CO., LTD) at 40° C. for 2 minutes to degrease the surface and then washed with water and dried to obtain metal sheets for coating.

GA: galvannealed steel sheets (sheet thickness of 1.6 mm, 10% by mass of Fe, plating adhesion amount of 45 g/m$^2$, and tensile strength of 1180 MPa)

AL: aluminum sheets (5000 series, sheet thickness of 1.6 mm)

2. Film Formation of Film Portion

Next, in order to form film portions having compositions shown in Table 1 on the metal sheets, respective components were mixed so as to have the same solid content concentrations as those in Table 1 to be formed, and water-based compositions and solvent-based compositions for forming the film portions were prepared. According to Table 1, the film portions were formed on the metal sheets by applying the obtained water-based compositions and solvent-based compositions on the substrates (metal sheets) shown in Tables 2 and 3 with a bar coater and performing drying using an oven under the conditions that the substrates were held at a maximum attainment temperature of 180° C. for 8 seconds. The adhesion amounts of the film portions were adjusted by the dilution of the water-based compositions and the solvent-based compositions and the number of the bar coater such that the average thickness of the film portions to be formed became numerical values shown in Table 2. In addition, in Table 1, the solid content concentrations of the respective components were described as the proportions (unit: volume %, value per one side) of the solid contents (nonvolatile contents) of the respective components to the solid contents (nonvolatile contents) of the entire water-based compositions or solvent-based compositions. Additionally, as for the metal sheets to be used for the same adhesively joined structure, the film portions were formed such that the adhesion amounts of the water-based compositions and the solvent-based compositions to be used and the film portions thereof were the same.

In addition, the protrusion rates of the inorganic particles and the average presence numbers of the protruding particles were calculated by the scanning electron microscope and the energy dispersive X-ray analysis as described above. Samples for cross section observation (width 500 μm) was produced from five cross sections obtained by dividing each metal sheet into 6 equal parts, and inorganic particles (non-oxide ceramics containing V, ferrosilicon) were identified by the energy dispersive X-ray analysis, and the protruding widths, the average presence numbers, and the average particle sizes of the protruding particles were confirmed with the scanning electron microscope (magnification 500).

Details of the respective components (symbols) in Table 1, Table 2 and Table 3 are as follows.

(A) Inorganic Particles

VB$_2$: Vanadium diboride particles (VB$_2$ particles) (specific gravity=5.1 g/cm$^3$)

VB: Vanadium monoboride particles (VB particles)

VN: Vanadium nitride particles (specific gravity=6.1 g/cm$^3$)

TN: Titanium nitride particles (specific gravity=6 g/cm$^3$)

FeSi: Ferrosilicon (JIS No. 2 ferrosilicon (75 to 80% by mass of Si content) conforming to JIS G 2302: 1998)

In addition, in the table, the average particle sizes in the film portions were measured for the average particle sizes of the ferrosilicon and the non-oxide ceramics containing V.

(B) Antirust pigment

PM: Magnesium phosphate (average particle size of 1 to 3 μm)

Si: Silica (amorphous silica having oil absorption amount of 100 to 1000 ml/100 g, specific surface area of 200 to 1000 m$^2$/g, average particle size of 1 to 30 μm) (Silo Mask 02 made by FUJI SILYSIA)

PMA: Aluminum tripolyphosphate (Mg coating) (Condensed aluminum phosphate K-450H made by TEIKA) (Average particle size of 1 to 3 μm)

Ca: 2CaO and V$_2$O$_5$ baked product (average particle size of 1 to 3 μm)

(C) Resin

P1: Polyester resin emulsion (Byronal (registered trademark) MD1985 by TOYOBO CO., LTD.) (water-based resin)

E1: Epoxy resin (ADEKA Resin EM-0178 (registered trademark) made by ADEKA CORPORATION) (water-based resin)

Solvent-based resin

P2: Organic solvent-soluble amorphous polyester resin (Byron GK140 made by TOYOBO CO., LTD.)

(D) Conductive particles

MgO: Magnesium oxide particles (average particle size=1.0 μm)

ZnO: Doped zinc oxide particles (Aluminum-doped conductive zinc oxide 23-Kt made by HAKUSUI TECH CO., LTD., average particle size=0.5 μm)

In addition, conductive particles, which were dispersed in water to which a resin was added and pulverized by a ball mill, were used as the above various conductive particles. As for the average particle sizes of the non-oxide ceramics particles and conductive particles, the average particle sizes in the film portions were measured. In addition, "-" in the table indicates that the listed material was not contained. The underlines indicate out of the scope of the invention.

mass of vanadium diboride particles ($VB_2$ particles) (average particle size of 1 to 3 μm and specific gravity=5.1 g/cm$^3$) to the epoxy resin-based adhesive of E2, and "E4" indicates an epoxy-based adhesive (Betamate (registered trademark) 1496S made by DOW CHEMICAL COL., LTD). Additionally, as for the adhesively joined structures according to the respective examples, similar adhesively joined structures were separately produced, and the protrusion rates (%) of the inorganic particles were determined by the above-described observation and calculation method. In addition, average values of the values of the first member and the second

TABLE 1

| Film No. | Inorganic Particles Type | Concentration (vol %) | Average Particle Size (μm) | Antirust Pigment Type | Concentration (vol %) | Average Particle Size (μm) | Conductive Particles Type | Concentration (vol %) | Resin Type | Concentration (wt %) |
|---|---|---|---|---|---|---|---|---|---|---|
| 0 | — | — | — | — | — | — | — | — | P1 | 100 |
| 1 | $VB_2$ | 1.5 | 3.0 | — | — | — | — | — | P1 | 98.5 |
| 2 | TN | 1.3 | 3.0 | — | — | — | — | — | P1 | 98.7 |
| 3 | $VB_2$ | 1.5 | 5.0 | — | — | — | — | — | P1 | 98.5 |
| 4 | $VB_2$ | 4.9 | 3.0 | — | — | — | — | — | PI | 95.1 |
| 5 | $VB_2$ | 8.9 | 3.0 | — | — | — | — | — | P1 | 91.1 |
| 6 | VB | 1.5 | 3.0 | — | — | — | — | — | P1 | 98.5 |
| 7 | VN | 1.3 | 3.0 | — | — | — | — | — | P1 | 98.7 |
| 8 | $VB_2$ | 1.7 | 3.0 | PM | 15.2 | 3 | — | — | P1 | 83.1 |
| 9 | $VB_2$ | 1.6 | 3.0 | Si | 15.1 | 3 | — | — | P1 | 83.3 |
| 10 | $VB_2$ | 1.6 | 3.0 | PMA | 15.1 | 3 | — | — | P1 | 83.3 |
| 11 | $VB_2$ | 1.5 | 3.0 | PMA | 2.1 | 3 | — | — | P1 | 96.4 |
| 12 | $VB_2$ | 1.8 | 3.0 | PMA | 37.3 | 3 | — | — | P1 | 60.9 |
| 13 | $VB_2$ | 1.8 | 3.0 | — | — | — | ZnO | 6.5 | PI | 98.2 |
| 14 | $VB_2$ | 1.6 | 3.0 | — | — | — | ZnO | 3.0 | P1 | 98.4 |
| 15 | $VB_2$ | 1.7 | 3.0 | — | — | — | MgO | 9.8 | P1 | 98.3 |
| 16 | $VB_2$ | 2.0 | 3.0 | PMA | 18.1 | 3 | ZnO | 7.1 | P1 | 72.8 |
| 17 | $VB_2$ | 1.5 | 3.0 | — | — | — | — | — | E1 | 98.5 |
| 18 | $VB_2$ | 1.5 | 3.0 | — | — | — | — | — | P1 | 98.5 |
| 19 | VN | 3.2 | 3.0 | — | — | — | ZnO | 6.9 | P1 | 96.8 |
| 20 | VN | 3.2 | 12.0 | — | — | — | ZnO | 6.9 | P1 | 96.8 |
| 21 | $VB_2$ | 6.8 | 3.0 | — | — | — | — | — | P1 | 93.2 |
| 22 | FeSi | 30.0 | 2.0 | Ca | 20.0 | 2 | — | — | P2 | 50 |
| 23 | FeSi | 30.0 | 3.5 | Ca | 20.0 | 2 | — | — | P2 | 50 |
| 24 | FeSi | 30.0 | 2.0 | — | — | — | — | — | P2 | 70 |
| 25 | $VB_2$ | 15.0 | 2.5 | — | — | — | — | — | P1 | 85 |
| 26 | $VB_2$ | 20.0 | 2.5 | — | — | — | — | — | P1 | 80 |

3. Forming

Next, formed members were obtained by bending the obtained metal sheets of the respective examples using a press brake so as to have shapes corresponding to the first member 2C and the second member 3C illustrated in FIG. 6. For the second member 3C illustrated in FIG. 6, the metal sheets of the respective examples were shear-cut to obtain members. In addition, in the present example, the shapes of the first member and the second member were the same hat type, the length was 600 mm, the width of the flange portions were 15 mm, the width of the web portions (top portion) was 80 mm, and the height of the web portions (top portions) were 60 mm 4. Bonding The adhesives illustrated in Tables 2 and 3 were applied to the flange portions of the obtained formed members, and two formed members were put together and simply fixed via a bonded portion. This was heated at 180° C. for 30 minutes to harden the adhesive, and an adhesively joined structure according to each example in which the two formed members were bonded via an adhesive layer was obtained.

In addition, in the table, "E2" indicates an epoxy resin-based adhesive (Scotchweld EW2045 made by 3M), "E3" indicates a mixture obtained by adding and mixing 5% by member were taken as the protrusion rates (%). Additionally, in this case, it was also observed whether or not the inorganic particles protrude from the film portions. The evaluation of the protrusion of the inorganic particles was C when there was no protrusion of the particles, B when the protrusion rate was 10% or less, and A when the protrusion rate was more than 10%. The passes were B or higher. In addition, each protrusion rate was an average value of five observation points obtained by dividing a region to which the adhesive was applied into five equal parts in the width direction.

The average presence numbers of the protruding particles per 500 μm were determined by the following method. First, the number of inorganic particles (protruding particles) protruding from each film portion present in an observed cross section (100 μm) was measured. The number of the obtained inorganic particles was divided by the width L (μm) of the observed cross section and multiplied by 500 to determine the average presence number of protruding particles per 500 μm.

In addition, the average value of five observation points obtained by dividing a region to which the adhesive was applied into five equal parts in the width direction was taken as the average presence number of protruding particles per 500 μm. By the same method, the number of particles protruding from the film portion and equal to or less than the film thickness of the film portion was measured, and the average presence number of protruding particles having a particle size equal to or less than the film thickness of the film portion was determined.

Additionally, as for the adhesively joined structures according to Examples 17, 18, 21, 29, 30, and 31, spot welding was further performed on the bonded portions. Specifically, spot welding was performed using a CF type Cr—Cu electrode of R40 having a tip diameter of 5 mm and at dotting intervals of 30 mm pitch under welding conditions where the nugget diameter was 3√t (t is sheet thickness). In addition, the spot welding portion was masked with tape or the like in advance before the spot welding, the adhesive was applied, and then the tape was exfoliated off to remove the adhesive layer. Additionally, in the adhesively joined structure according to Example 18, dust was generated during the welding. A case where the spot welding was performed and no dust was generated was designated as A, and a case where dust was generated was designated as B.

5. Evaluation of Bonding Durability

The bonding durability of each of the obtained adhesively joined structures according to the respective examples was evaluated.

First, the torsional rigidity of the adhesively joined structure according to each example was measured and calculated by a torsion tester. Specifically, both end portions of the adhesively joined structure according to each example were fixed with a jig, and only one end portion was rotated with a central axis of the joined structure as a rotational axis to add torsional distortion to the adhesively joined structure. In this case, the torsional angle and the torsional moment were measured, and the torsional rigidity of each adhesively joined structure was calculated from a relationship between the torsional angle and the torsional moment in an elastic distortion range. As the relationship between the torsional angle and the torsional moment in the elastic distortion range, specifically, the initial inclination of a torsional angle-torsional moment diagram was used.

Next, the adhesively joined structure according to each example was allowed to stand in a constant temperature and humidity bath having a wet environment of 80° C. and a relative humidity of 95% for 500 hours to promote deterioration of the adhesive layer and the adhesive layer/film portion interface.

The torsional rigidity of the adhesively joined structure according to each example after the standing in the constant temperature and humidity bath was measured and calculated by the torsion tester. Then, the rate of decrease in the torsional rigidity due to the deterioration was calculated in comparison with the torsional rigidity of the adhesively joined structure according to each example for which no deterioration test was performed, and this was used as an evaluation index of the bonding durability. The passes were determined when the rate of decrease in the torsional rigidity was 40% or less. The results are illustrated in Tables 2 and 3. In addition, "-" of the particle protrusion in Tables 2 and 3 indicates that no particles are contained, and "-" of the spot welding indicates that no spot welding is performed. Additionally, the underlines in Tables 2 and 3 indicate out of the scope of the invention.

TABLE 2

| | Substrate | | | | | | Film Portion | | | Member Joining Method | | Bonding Durability Torsional Rigidity |
|---|---|---|---|---|---|---|---|---|---|---|---|---|
| | First Member | Second Member | No. | Thickness (μm) | Particle Protrusion | Protrusion Rate (%) | Average Presence Number of Protruding Particles per 500 μm (Pieces) | Average Presence Number of Protruding Particles Equal to or Less Than Film Thickness per 500 μm (Pieces) | Adhesive | Bonding Presence/ Absence | Spot Welding | Rate of decrease (%) |
| Example 1 | GA | GA | 1 | 2.0 | A | 94 | 2.10 | 1.30 | E2 | Yes | — | 20 |
| Example 2 | GA | GA | 1 | 2.5 | A | 74 | 2.60 | 2.00 | E2 | Yes | — | 22 |
| Example 3 | GA | GA | 1 | 3.0 | B | 10 | 1.20 | 0.50 | E2 | Yes | — | 35 |
| Comparative Example 1 | GA | GA | 1 | 3.5 | C | 0 | 0.00 | 0.00 | E2 | Yes | — | 83 |
| Example 4 | GA | GA | 3 | 3.5 | A | 92 | 1.30 | 0.60 | E2 | Yes | — | 21 |
| Example 5 | GA | GA | 3 | 4.0 | A | 80 | 1.50 | 0.80 | E2 | Yes | — | 25 |
| Example 6 | GA | GA | 3 | 5.0 | B | 10 | 1.00 | 0.60 | E2 | Yes | — | 32 |
| Comparative Example 2 | GA | GA | 3 | 6.0 | C | 0 | 0.00 | 0.00 | E2 | Yes | — | 85 |
| Comparative Example 3 | GA | GA | 0 | 3.0 | — | — | — | — | E2 | Yes | — | 90 |
| Comparative Example 4 | GA | GA | 2 | 2.5 | A | 92 | 2.30 | 1.50 | E2 | Yes | — | 86 |
| Example 7 | GA | GA | 4 | 2.5 | A | 74 | 8.75 | 6.50 | E2 | Yes | — | 19 |
| Example 8 | GA | GA | 5 | 2.5 | A | 74 | 16.50 | 13.10 | E2 | Yes | — | 17 |
| Example 9 | GA | GA | 6 | 2.5 | A | 74 | 2.50 | 1.50 | E2 | Yes | — | 25 |
| Example 10 | GA | GA | 7 | 2.5 | A | 74 | 2.60 | 1.40 | E2 | Yes | — | 24 |
| Example 11 | GA | GA | 8 | 2.5 | A | 74 | 3.30 | 2.00 | E2 | Yes | — | 19 |
| Example 12 | GA | GA | 9 | 2.5 | A | 74 | 3.20 | 2.40 | E2 | Yes | — | 19 |
| Example 13 | GA | GA | 10 | 2.5 | A | 74 | 3.30 | 1.80 | E2 | Yes | — | 18 |

TABLE 2-continued

| | Substrate | | | | | Film Portion | | | Member Joining Method | | Bonding Durability Torsional Rigidity |
|---|---|---|---|---|---|---|---|---|---|---|---|
| | First Member | Second Member | No. | Thickness (μm) | Particle Protrusion | Protrusion Rate (%) | Average Presence Number of Protruding Particles per 500 μm (Pieces) | Average Presence Number of Protruding Particles Equal to or Less Than Film Thickness per 500 μm (Pieces) | Bonding Adhesive | Presence/ Absence | Spot Welding | Rate of decrease (%) |
| Example 14 | GA | GA | 11 | 2.5 | A | 74 | 2.70 | 1.60 | E2 | Yes | — | 22 |
| Example 15 | GA | GA | 12 | 2.5 | A | 74 | 4.90 | 3.20 | E2 | Yes | — | 20 |
| Example 16 | GA | GA | 13 | 2.5 | A | 74 | 3.40 | 1.40 | E2 | Yes | — | 18 |

TABLE 3

| | Substrate | | | | | Film Portion | | | Member Joining Method | | Bonding Durability Torsional Rigidity |
|---|---|---|---|---|---|---|---|---|---|---|---|
| | First Member | Second Member | No. | Thickness (μm) | Particle Protrusion | Protrusion Rate (%) | Average Presence Number of Protruding Particles per 500 μm (Pieces) | Average Presence Number of Protruding Particles Having Particle Size Equal to or Less Than Film Thickness per 500 μm (Pieces) | Bonding Adhesive | Presence/ Absence | Spot Welding | Rate of decrease (%) |
| Example 17 | GA | GA | 13 | 2.5 | A | 74 | 3.30 | 1.4 | E2 | Yes | A | 5 |
| Example 18 | GA | GA | 14 | 2.5 | A | 74 | 2.92 | 2.0 | E2 | Yes | B | 13 |
| Example 19 | GA | GA | 15 | 2.5 | A | 74 | 3.20 | 1.4 | E2 | Yes | — | 20 |
| Example 20 | GA | GA | 16 | 2.5 | A | 74 | 4.51 | 3.1 | E2 | Yes | — | 15 |
| Example 21 | GA | GA | 16 | 2.5 | A | 74 | 4.40 | 2.2 | E2 | Yes | A | 4 |
| Example 22 | GA | GA | 17 | 2.5 | A | 74 | 2.61 | 1.5 | E2 | Yes | — | 22 |
| Example 23 | GA | GA | 18 | 2.5 | A | 74 | 7.10 | 5.4 | E3 | Yes | — | 17 |
| Comparative Example 5 | GA | GA | 19 | 10 | C | 0 | 0.00 | 0.0 | E2 | Yes | — | 87 |
| Example 24 | GA | GA | 20 | 10 | A | 75 | 1.77 | 1.0 | E2 | Yes | — | 25 |
| Example 25 | GA | AL | 1 | 2.0 | A | 94 | 2.00 | 0.8 | E2 | Yes | — | 25 |
| Example 26 | GA | AL | 1 | 2.5 | A | 74 | 2.80 | 1.3 | E2 | Yes | — | 27 |
| Example 27 | GA | AL | 1 | 3.0 | B | 10 | 1.30 | 0.4 | E2 | Yes | — | 40 |
| Comparative Example 6 | GA | AL | 1 | 3.5 | C | 0 | 0.00 | 0.0 | E2 | Yes | — | 88 |
| Example 28 | GA | GA | 21 | 3.5 | A | 17 | 2.60 | 1.2 | E2 | Yes | — | 37 |
| Example 29 | GA | GA | 22 | 1.5 | A | 87 | 14.30 | 10.5 | E4 | Yes | A | 18 |
| Example 30 | GA | GA | 23 | 3.0 | A | 70 | 12.70 | 9.5 | E4 | Yes | A | 16 |
| Example 31 | GA | GA | 24 | 1.5 | A | 87 | 13.60 | 9.5 | E4 | Yes | A | 30 |
| Example 32 | GA | GA | 25 | 2.5 | A | 80 | 18.10 | 13.1 | E2 | Yes | — | 13 |
| Example 33 | GA | GA | 26 | 2.5 | A | 75 | 23.30 | 14.3 | E2 | Yes | — | 9 |
| Comparative Example 7 | GA | GA | 1 | 1.5 | A | 96 | 1.24 | 0.0 | E2 | Yes | — | 65 |

As illustrated in Tables 2 and 3, in the adhesively joined structures according to Examples 1 to 33, the decrease in torsional rigidity was significantly suppressed as compared to the adhesively joined structures according to Comparative Examples 1 to 7, and the bonding durability was excellent. In the adhesively joined structure according to Comparative Example 3, since the inorganic particles formed of the ferrosilicon or the non-oxide ceramics containing V were not contained, the effect of improving the bonding durability could not be obtained. In the adhesively joined structure according to Comparative Example 4, the non-oxide ceramics particles protruded from the film portion. However, since the vanadium nitride particles were not the inorganic particles formed of the ferrosilicon or the non-oxide ceramics containing V, the effect of improving the bonding durability was not obtained. In the adhesively joined structures according to Comparative Examples 5 and 6, since the inorganic particles formed of the ferrosilicon or the non-oxide ceramics containing V did not protrude from the film portions, the effect of improving the bonding durability could not be obtained. In the adhesively joined structure according to Comparative Example 7, since the inorganic particles formed of ferrosilicon or the non-oxide ceramics containing V of which the particle size was less than the thickness of the film portion did not protrude, the effect of improving the bonding durability was small.

Additionally, comparing Examples 2, 9, and 10 with each other, in the adhesively joined structure according to Example 2 using $VB_2$ (vanadium diboride particles) among the non-oxide ceramics containing V, the decrease in torsional rigidity was suppressed most. It is considered that this is because $VB_2$ of the non-oxide ceramics containing V used has the maximum barrier property against water.

Moreover, when Examples 1 to 3, Comparative Example 1, and Examples 4 to 6 and Comparative Example 2 are reviewed, in a case where the average particle sizes of the inorganic particles formed of the non-oxide ceramics containing V are the same, it is suggested that, as the thickness of the film portions is smaller, the amount of protrusion of the inorganic particles formed of the non-oxide ceramics containing V from the film portions is larger and the bonding durability is improved.

Additionally, comparing Examples 2, 7, and 8 with each other, it is suggested that, as the amount of the inorganic particles formed of the non-oxide ceramics containing V is higher, the bonding durability is improved.

Comparing Example 2 with Examples 11 to 15, it is suggested that the bonding durability is slightly improved by adding the antirust pigments to the film portions. It is considered that the antirust pigments suppress the corrosion of the substrates. On the other hand, it is also found that, when the amount of the antirust pigments are too large or too small, it is difficult to obtain the effect of the antirust pigments.

In Examples 17, 18, 21, 29, 30, and 31, the spot welding is possible by adding the conductive particles to the film portions. Comparing Examples 20 and 21, it is found that the decrease in torsional rigidity can be significantly suppressed by using the spot welding in combination with the bonding. Additionally, in Example 18 in which the conductive particles are not sufficiently added, dust is generated. In this case, the effect of suppressing the decrease in torsional rigidity is smaller than in other examples in which no dust is generated.

Additionally, in a case where Examples 2, 13, and 20 are compared with each other, the decrease in torsional rigidity can be much further suppressed by combining PMA: aluminum tripolyphosphate (Mg coating) as an antirust pigment and ZnO: doped zinc oxide particles as the conductive particles. It is considered that this is because a poorly soluble composite compound is generated in a film by Mg and Zn, and the corrosion resistance of the joined structure is improved.

In Example 23, by adding the inorganic particles formed of the non-oxide ceramics containing V to the adhesive layer, it is possible to much further suppress the decrease in torsional rigidity as compared to Example 2. It is considered that this is because the water resistance of the adhesive itself is improved by containing the inorganic particles formed of the non-oxide ceramics containing V in the adhesive layer.

Additionally, as can be seen in Examples 24 to 27, it is possible to suppress the decrease in torsional rigidity not only between the zinc-plated steel sheets but also between different types of metal sheets, and it is possible to improve the bonding durability.

In Examples 29 to 31, since the ferrosilicon was contained and the ferrosilicon protrudes into the adhesive layer, it is possible to suppress the decrease in torsional rigidity.

In Examples 32 and 33, it is possible to suppress the decrease in torsional rigidity as the average presence number of the protruding particles having a particle size equal to or less than the film thickness of the film portions increases. It is presumed that this is because many particles of which the particle size is smaller than the film thickness are present, so the particles protrude again onto the film surface after press forming even if the particles are pushed into the resin due to the contact pressure and sliding during the press forming.

Example 2

[Manufacturing of Adhesively Joined Structure]
1. Preparation of Metal Sheet

The following zinc-plated steel sheets GA were prepared and immersed in an aqueous solution of 2.5% by mass of an aqueous alkaline degreasing agent (FC-301 made by NIHON PARKERIZING CO., LTD) at 40° C. for 2 minutes to degrease the surface and then washed with water and dried to obtain metal sheets for coating.

GA: galvannealed steel sheets (sheet thickness of 1.6 mm, 10% by mass of Fe, plating adhesion amount of 45 g/m², and tensile strength of 1180 MPa)

2. Film Formation of Film Portion

Next, in order to form film portions having compositions shown in Table 4 on the metal sheets, respective components were mixed so as to have the same solid content concentrations as those in Table 4 to be formed, and water-based compositions and solvent-based compositions for forming the film portions were prepared. In addition, the particle size distribution of the inorganic particles was adjusted with a bead mill before mixing so as to have the average particle sizes and the mode diameters shown in Table 4. The symbols in Table 4 mean the same symbols as those in Table 1.

TABLE 4

| | Inorganic Particles | | | | Antirust Pigment | | | Conductive Particles | | Resin | |
| --- | --- | --- | --- | --- | --- | --- | --- | --- | --- | --- | --- |
| Film No. | Type | Concentration (vol %) | Average Particle Size (μm) | Mode Diameter (μm) | Type | Concentration (vol %) | Average Particle Size (μm) | Type | Concentration (vol %) | Type | Concentration (wt %) |
| 27 | $VB_2$ | 8.9 | 3.0 | 2.8 | — | — | — | — | — | P1 | 91.1 |
| 28 | $VB_2$ | 8.9 | 3.0 | 2.3 | — | — | — | — | — | P1 | 91.1 |
| 29 | FeSi | 30.0 | 2.0 | 2.3 | — | — | — | — | — | P2 | 70.0 |
| 30 | FeSi | 30.0 | 2.0 | 1.5 | — | — | — | — | — | P2 | 70.0 |
| 31 | FeSi | 30.0 | 2.0 | 1.2 | — | — | — | — | — | P2 | 70.0 |

According to Table 4, the film portions were formed on the metal sheets by applying the obtained water-based compositions and solvent-based compositions on the substrates (metal sheets) shown in Table 5 with a bar coater and performing drying using an oven under the conditions that the substrates were held at a maximum attainment temperature of 180° C. for 8 seconds. The adhesion amounts of the film portions were adjusted by the dilution of the water-based compositions and the solvent-based compositions and the number of the bar coater such that the average thickness of the film portions to be formed became numerical values shown in Table 1. In addition, in Table 4, the solid content concentrations of the respective components were described as the proportions (unit: volume %, value per one side) of the solid contents (nonvolatile contents) of the respective components to the solid contents (nonvolatile contents) of the entire water-based compositions or solvent-based compositions. Additionally, as for the metal sheets to be used for the same adhesively joined structure, the film portions were formed such that the adhesion amounts of the water-based compositions and the solvent-based compositions to be used and the film portions thereof were the same.

3. Forming

Next, formed members in which the surfaces of the metal sheets slid were obtained by press forming the obtained metal sheets of the respective examples using a die and punch so as to have a shape corresponding to the first member 2C illustrated in FIG. 6. For the second member 3C illustrated in FIG. 6, the metal sheets of the respective examples was shear-cut to obtain members. In addition, in the present example, the shapes of the first member and the second member were the same hat type, the length was 600 mm, the width of the flange portions were 15 mm, the width of the web portions (top portion) was 80 mm, and the height of the web portions (top portions) were 60 mm.

4. Bonding

The adhesives illustrated in Table 5 were applied to the flange portions of the obtained formed members, and two formed members were put together and simply fixed via a bonded portion. This was heated at 180° C. for 30 minutes to harden the adhesive, and an adhesively joined structure according to each example in which the two formed members were bonded via an adhesive layer was obtained. The protrusion rates, the average presence numbers of protruding particles per 500 μm, and the average presence numbers of protruding particles having a particle size of film thickness or less per 500 μm in Table 5 were measured by the same method as in Example 1.

5. Evaluation of Bonding Durability

The bonding durability of each of the obtained adhesively joined structures according to the respective examples was evaluated.

First, the torsional rigidity of the adhesively joined structure according to each example was measured and calculated by a torsion tester. Specifically, both end portions of the adhesively joined structure according to each example were fixed with a jig, and only one end portion was rotated with a central axis of the joined structure as a rotational axis to add torsional distortion to the adhesively joined structure. In this case, the torsional angle and the torsional moment were measured, and the torsional rigidity of each adhesively joined structure was calculated from a relationship between the torsional angle and the torsional moment in an elastic distortion range. As the relationship between the torsional angle and the torsional moment in the elastic distortion range, specifically, the initial inclination of a torsional angle-torsional moment diagram was used.

Next, the adhesively joined structure according to each example was allowed to stand in a constant temperature and humidity bath having a wet environment of 80° C. and a relative humidity of 95% for 500 hours to promote deterioration of the adhesive layer and the adhesive layer/film portion interface.

The torsional rigidity of the adhesively joined structure according to each example after the standing in the constant temperature and humidity bath was measured and calculated by the torsion tester. Then, the rate of decrease in the torsional rigidity due to the deterioration was calculated in comparison with the torsional rigidity of the adhesively joined structure according to each example for which no deterioration test was performed, and this was used as an evaluation index of the bonding durability. The passes were determined when the rate of decrease in the torsional rigidity was 40% or less. The results are illustrated in Table 5. The symbols in Table 5 have the same meanings as those in Tables 2 and 3.

TABLE 5

| | Substrate | | | | | | Film Portion | | | | |
| --- | --- | --- | --- | --- | --- | --- | --- | --- | --- | --- | --- |
| | First Member | Second Member | No. | Thickness (μm) | Particle Protrusion | Protrusion Rate (%) | Average Presence Number of Protruding Particles per 500 μm (Pieces) | Average Presence Number of Protruding Particles Having Particle Size Equal to or Less Than Film Thickness per 500 μm (Pieces) | Member Joining Method Adhesive | Bonding Presence/Absence | Bonding Durability Torsional Rigidity Rate of decrease (%) |
| Example 34 | GA | GA | 27 | 2.5 | A | 74 | 13.5 | 10.5 | E2 | Yes | 27 |
| Example 35 | GA | GA | 28 | 2.5 | A | 74 | 17.0 | 14.5 | E2 | Yes | 16 |
| Example 36 | GA | GA | 29 | 1.5 | A | 87 | 10.3 | 7.1 | E4 | Yes | 35 |
| Example 37 | GA | GA | 30 | 1.5 | A | 87 | 12.2 | 8.5 | E4 | Yes | 30 |
| Example 38 | GA | GA | 31 | 1.5 | A | 87 | 13.6 | 11.6 | E4 | Yes | 27 |

Comparing Examples 34 and 35 with each other, although the inorganic particles had the same average particle size, the rate of decrease in torsional rigidity was lower in Example 35. It is presumed that this is because many particles of which the particle size is smaller than the film thickness of the film portion are present, so the particles protrude again toward the film surface after the particles are pushed into the resin due to the contact pressure and sliding during the press forming.

Similarly, when Examples 36 to 38 were compared with each other, it was confirmed that, as the mode particle size was smaller than the film thickness, the rate of decrease in torsional rigidity of the components manufactured by the press forming decreased.

Although the preferred embodiment of the present invention have been described above in detail with reference to the accompanying drawings, the present invention is not limited to such an example. It is apparent that those having ordinary knowledge in the technical field to which the present invention belongs can conceive various changes or modifications within the scope of the technical ideas described in the claims, and it is naturally understood that these also belong to the technical scope of the present invention.

BRIEF DESCRIPTION OF THE REFERENCE SYMBOLS 1, 1A, 1B, 1C, 1D, 1E adhesively joined structure
2, 2A, 2B, 2C, 2D, 2E first member
21, 21A, 21B metal portion
22, 22A, 22B, film portion
221, 221B inorganic particles
3, 3A, 3B, 3C, 3D, 3E second member
31, 31B metal portion
32, 32B film portion
321, 321B inorganic particles
4, 4A, 4B, 4C, 4D, 4E adhesive layer
5, 5C, 5D, joining region

The invention claimed is:

1. An adhesively joined structure comprising:
a first member having a metal portion and a film portion disposed on at least a part of a surface of the metal portion;
a second member;
an adhesive layer for joining the first member and the second member to each other via the film portion,
wherein the film portion contains a resin and inorganic particles,
the inorganic particles are formed of ferrosilicon or non-oxide ceramics containing V,
some of the inorganic particles protrude into the adhesive layer, and
a particle size of at least some of the inorganic particles protruding toward the adhesive layer is less than a film thickness of the film portion.

2. The adhesively joined structure according to claim 1, wherein, in a cross section taken in a thickness direction of the film portion,
an average presence number of the protruding inorganic particles of which the particle size is less than the film thickness of the film portion is 0.5 pieces to 20.0 pieces per length 500 μm in a surface direction of a surface of the film portion on the adhesive layer side.

3. The adhesively joined structure according to claim 2, wherein, in a cross section taken in a thickness direction of the film portion, a percentage of a protruding width of the inorganic particles to an average particle size of the inorganic particles is 10% to 95% on average, and in the cross section,
an average presence number of the protruding inorganic particles per length 500 μm in a surface direction of a surface of the film portion on the adhesive layer side is 1.0 piece to 20.0 pieces.

4. The adhesively joined structure according to claim 1, wherein, in a cross section taken in a thickness direction of the film portion, a percentage of a protruding width of the inorganic particles to an average particle size of the inorganic particles is 10% to 95% on average, and in the cross section,
an average presence number of the protruding inorganic particles per length 500 μm in a surface direction of a surface of the film portion on the adhesive layer side is 1.0 piece to 20.0 pieces.

5. The adhesively joined structure according to claim 1, wherein an average particle size of the inorganic particles is 1.0 μm to 15.0 μm, and
an average thickness of the film portion is 1.0 μm to 20.0 μm.

6. The adhesively joined structure according to claim 1, wherein the film portion further contains conductive particles.

7. The adhesively joined structure according to claim 6, wherein the conductive particles include doped zinc oxide particles.

8. The adhesively joined structure according to claim 7, wherein the film portion further contains an antirust pigment containing Mg.

9. The adhesively joined structure according to claim 1, wherein the film portion further contains a vanadium-based antirust pigment.

10. The adhesively joined structure according to claim 1, wherein the film portion further contains a silica-based antirust pigment.

11. The adhesively joined structure according to claim 1, wherein a resin of an adhesive constituting the adhesive layer has a common chemical structure with the resin in the film portion.

12. The adhesively joined structure according to claim 1, wherein the adhesive layer contains an epoxy resin-based adhesive or an urethane resin-based adhesive.

13. The adhesively joined structure according to claim 1, wherein the adhesive layer contains inorganic particles formed of the ferrosilicon or the non-oxide ceramics containing V.

14. The adhesively joined structure according to claim 1, wherein the metal portion is a steel.

15. The adhesively joined structure according to claim 1, wherein the metal portion is a zinc-plated steel sheet.

16. The adhesively joined structure according to claim 1, wherein the metal portion is a galvannealed steel sheet having a tensile strength of 980 MPa or more.

17. A component for a vehicle comprising:
the adhesively joined structure according to claim 1.

* * * * *